US011912549B2

(12) United States Patent
Stewart et al.

(10) Patent No.: US 11,912,549 B2
(45) Date of Patent: Feb. 27, 2024

(54) ACTIVE ARM ADAPTER FOR VEHICLE LIFT

(71) Applicant: Vehicle Service Group, LLC, Madison, IN (US)

(72) Inventors: Jason Stewart, Harvest, AL (US); Ron Schneider, Addyston, OH (US)

(73) Assignee: Vehicle Service Group, LLC, Madison, IN (US)

( * ) Notice: Subject to any disclaimer, the term of this patent is extended or adjusted under 35 U.S.C. 154(b) by 86 days.

(21) Appl. No.: 17/336,285

(22) Filed: Jun. 1, 2021

(65) Prior Publication Data

US 2021/0371259 A1 Dec. 2, 2021

Related U.S. Application Data

(60) Provisional application No. 63/033,264, filed on Jun. 2, 2020.

(51) Int. Cl.
*B66F 7/28* (2006.01)

(52) U.S. Cl.
CPC .................................... *B66F 7/28* (2013.01)

(58) Field of Classification Search
CPC ................ B66F 7/28; B66F 7/26; B66F 3/36
See application file for complete search history.

(56) References Cited

U.S. PATENT DOCUMENTS 3,205,977 A * 9/1965 Goldzwig ................ B66F 7/18 187/219
4,023,649 A * 5/1977 Wood ........................ B66F 7/28 248/200.1
4,287,965 A * 9/1981 Pearson .................... B66F 7/28 187/219

(Continued)

FOREIGN PATENT DOCUMENTS

EP 0487145 A1 * 5/1992 ................ B66F 7/00
EP 3770104 A1 1/2021

(Continued)

OTHER PUBLICATIONS

Extended European Search Report dated Nov. 8, 2021, for EP Application No. 21177203.3, 10 pages.

*Primary Examiner* — Michael R Mansen
*Assistant Examiner* — Michelle M Lantrip
(74) *Attorney, Agent, or Firm* — Frost Brown Todd LLP

(57) ABSTRACT

A vehicle arm adapter that includes a base member, a platform assembly coupled to the base member, and an adjustable frame retaining assembly coupled with the platform assembly. The base member can selectively couple with a lifting arm of a vehicle lift. The platform assembly includes a vehicle engagement surface. The platform assembly can engage and lift a vehicle in coordination with the vehicle lift. The adjustable frame retaining assembly includes a first retractable assembly and a second retractable assembly that are both capable of actuating between an extend configuration and a retracted configuration. The first and second frame retaining assemblies can cooperate to contain a first subset of vehicle frames in the extended configuration. The first and second frame retaining assemblies are prevented from retaining a second subset of vehicle frames in the retracted configuration.

20 Claims, 19 Drawing Sheets

(56) References Cited

U.S. PATENT DOCUMENTS

| | | | | |
|---|---|---|---|---|
| 4,658,933 | A * | 4/1987 | Cheek | B66F 7/28 254/2 B |
| 5,052,520 | A | 10/1991 | Wakamiya | |
| 11,352,242 | B2 * | 6/2022 | Thomas | F16M 13/02 |
| 2008/0100015 | A1 * | 5/2008 | Symiczek | B66F 7/28 280/79.4 |
| 2008/0224107 | A1 * | 9/2008 | Polins | B66F 7/0666 254/45 |
| 2015/0129820 | A1 * | 5/2015 | Svihla | B66F 7/28 254/3 B |

FOREIGN PATENT DOCUMENTS

| | | | |
|---|---|---|---|
| EP | 3770105 | A1 | 1/2021 |
| JP | S52-023449 | U | 2/1977 |
| JP | H01-094397 | U | 6/1989 |

* cited by examiner

ACTIVE ARM ADAPTER FOR VEHICLE LIFT

BACKGROUND

A vehicle lift is a device operable to lift a vehicle such as a car, truck, bus, etc. Vehicle lifts have varying designs and capabilities, including platform lifts that lift a parked vehicle via contact with tires in order to allow access to the underside of the vehicle; as well as frame-engaging lifts that raise a vehicle by contacting structural lifting points on the frame of the vehicle, allowing access to the underside of the vehicle and allowing wheels and tires to be removed or serviced.

Since vehicle service often includes removing or inspecting tires and wheels, frame-engaging lifts may be a popular option. However, it may be desirable for a single frame-engaging lift to lift various types of vehicles having different structural frames. For instance, it may be desirable for a frame-engaging lift to lift a first vehicle having a unibody frame or a pinch weld frame, then lift a subsequent vehicle having a truck frame with a slick undercoating applied. Different vehicle frames may require different adapters in order for frame-engaging lifts to suitably engage each vehicle frame. For example, a vehicle having a pinch weld or unibody frame may require a flat rubber pad adapter in order for frame-engaging lift to suitably engage such a vehicle; while a vehicle having a truck frame (often having a slick undercoating applied) may require an adapter with rigid frame constraining "ears" that prevent a truck frame from slipping off adapters during exemplary use.

Therefore, an operator may have to install a first set of adapters on a frame-engaging lift to suitably lift a vehicle having a first type of frame, then replace those adapters with a second set of adapters on the frame-engaging lift to suitably lift a vehicle having a second, different, type of frame.

While a variety of vehicle lifts and adapters have been made and used, it is believed that no one prior to the inventor(s) has made or used an invention as described herein.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

Figure 1A:
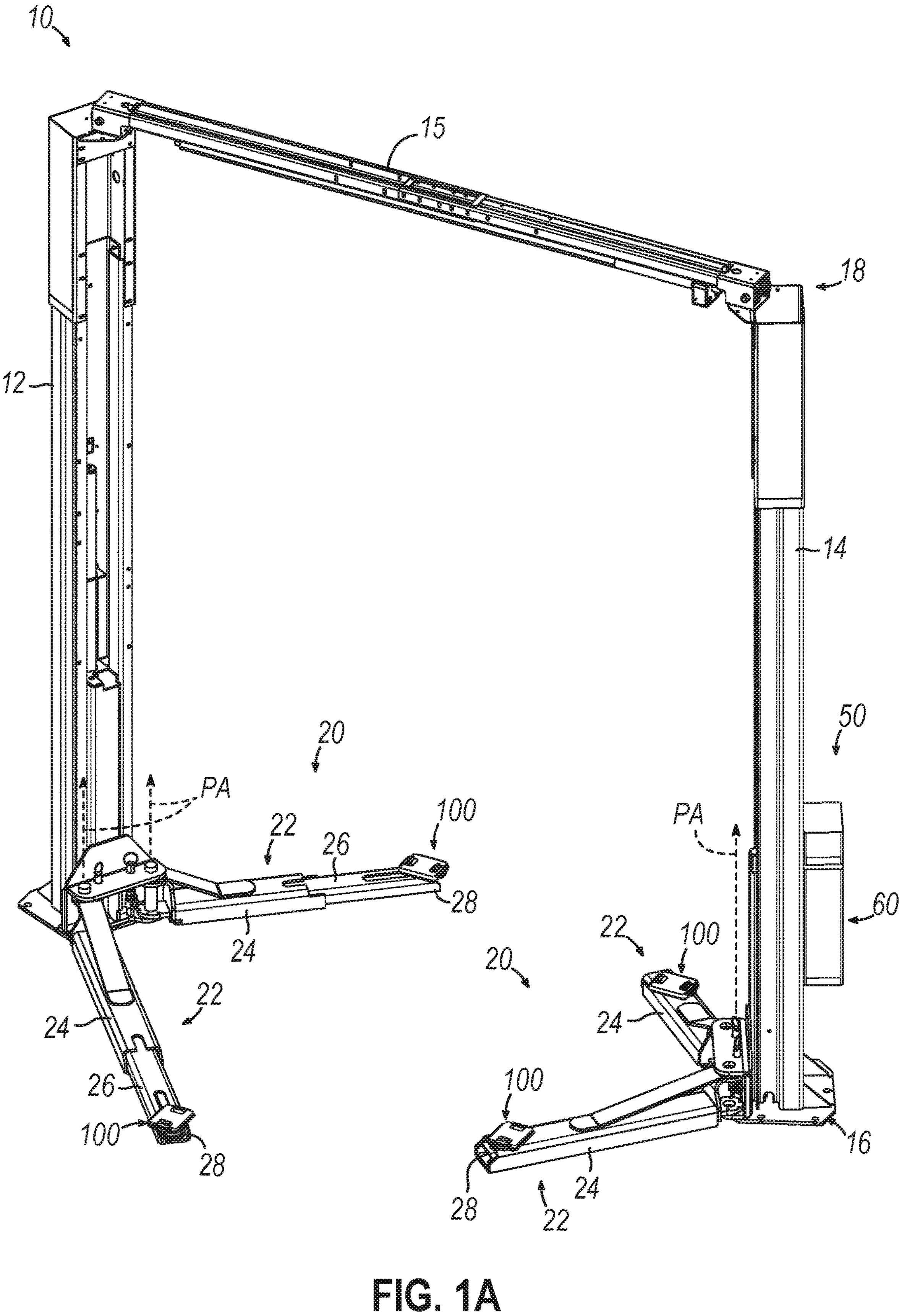
FIG. 1A is a perspective view of an exemplary two-post lift assembly in a lowered configuration.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Overview of Exemplary Frame-Engaging Lift

Figure 1B:
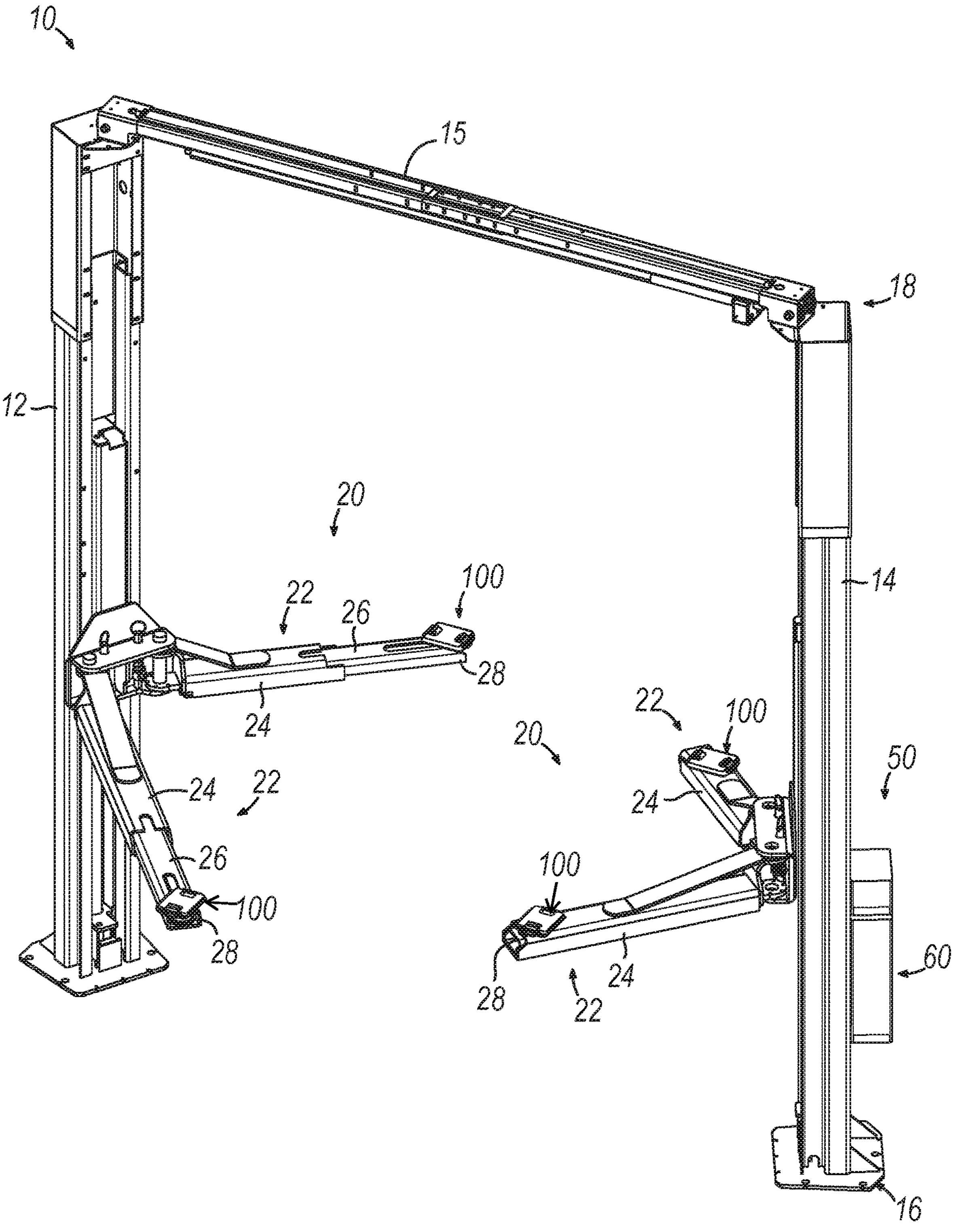
FIG. 1B is a perspective view of the two-post lift assembly of FIG. 1A in a raised configuration.

FIGS. 1A-1B show an exemplary frame-engaging vehicle lift, a two-post lift (10), that can be used to raise a vehicle, allow access to the underside of the vehicle, and allow wheels and tires of the vehicle to be removed or serviced. While the current frame-engaging vehicle lift is two-post lift (10), any other suitable frame-engaging vehicle lift may be used as would be apparent to one skilled in the art in view of the teachings herein. For example, the frame-engaging vehicle lift may be a scissor-lift assembly, a four-post lift, an in-ground lift, one or more portable lifts, etc.

Two-post lift (10) includes a pair of lift posts (12, 14), a crossbar (15) extending between lift posts (12, 14), a pair of lifting carriages (20) operatively coupled to a respective lift post (12, 14), a control assembly (50), and a drive assembly (60). Lift posts (12, 14) extend from a floor (16) to an elevated portion (18), while a crossbar (15) extends between lift posts (12, 14) at elevated portion (18). Crossbar (15), while entirely optional, may provide at least some degree of structural stability between lift posts (12, 14).

Lifting carriages (20) are configured to synchronously actuate along a path defined by respective lift posts (12, 14) between a lowered position (as shown in FIG. 1A) and a raised position (as shown in FIG. 1B). Lifting carriages (20) may also selectively lock into place relative to respective lift posts (12, 14) such that lifting carriages (20) may be prevented from inadvertently lowering once reaching a desired height. Therefore, lift posts (12, 14) may provide a mechanical path for respective lifting carriages (20) to actuate along. Any suitable components to promote synchronous actuation and locking of lifting carriages (20) relative to lift posts (12, 14) may be used as would be apparent to one skilled in the art in view of the teachings herein. As will be described in greater detail below, lifting carriages (20) are configured to engage the frame of a vehicle such that as lifting carriages (20) actuate between the lowered position (as shown in FIG. 1A) and the raised position (as shown in FIG. 1B), the vehicle will also be lifted and lowered between a corresponding lowered and raised position.

Each lifting carriage (20) includes a pair of adjustable lifting arms (22) configured to be adjusted relative to their respective lifting post (12, 14) and relative to each other in order to suitably engage a vehicle frame. Each lifting arm (22) includes a collar (24) and an adjustable body (26) terminating into an adapter coupling end (28).

Each collar (24) is pivotably coupled to a base of the respective carriage (20) about a pivot axis (PA) such that collar (24), adjustable body (26), and adapter coupling end (28) may be pivoted about pivot axis (PA) together into various rotational positions. In some instances, carriages (20) may have a pivot locking mechanism to selectively fix each collar (24) into a desired rotational position about pivot axis (PA). Therefore, lifting arms (22) may be pivoted and locked into a desired rotational position relative to the base of carriage (20) in order to suitably align with a specific vehicle frame for lifting purposes.

Adjustable body (26) may actuate along a linear path defined by a respective collar (24) and into various longitudinal positions relative to collar (24). In some instances, carriages (20) may have a linear locking mechanism to selectively fix the longitudinal position of adjustable body (26) relative to the respective collar (24). Therefore, adjustable body (26) may be actuated and locked into a desired longitudinal position relative to the respective collar (24) in order to suitably align with a specific vehicle frame for lifting purposes.

Adjustable body (26) and adapter coupling end (28) may be fixed relative to each other, although this is merely optional. Adapter coupling end (28) is configured to selectively couple with various arm adapters, such as arm adapter (100). Arm adapters (100) may be configured to suitably engage vehicle frames such that lifting carriages (20) may lift vehicles in accordance with the description herein. As mentioned above, for various reasons, previously different arm adapters may have been desired for different types of vehicle frames. As will be described in greater detail below, arm adapter (100) is configured to accommodate various types of vehicle frames without having to replace arm adapters (100) from two-post lift (10).

Two-post lift (10) may be connected to a power supply (not pictured) to provide power to various components of two-post lift (10), such as control assembly (50) and drive assembly (60). Control assembly (50) is operatively connected to drive assembly (60) such that an operator may utilize control assembly (50) to selectively activate drive assembly (60) in accordance with the teachings herein. Control assembly (50) may include any suitable components, such as a processor, logic control, etc., as would be apparent to one skilled in the art in view of the teachings herein. Additionally, control assembly (50) may include any suitable number of user input features in order to utilize two-post lift (10) in accordance with the description herein. In the current example, control assembly (50) is physically attached to the rest of two-post lift (10), however, this is merely optional. In some instances, control assembly (50) may be detached from the rest of two-post lift (10) such that control assembly (50) is in wired/wireless communication with other suitable components of two-post lift (10). In some instances, control assembly (50) is incorporated into a wireless pendant, a smart phone, a tablet, or a control station such as a desktop or laptop.

Drive assembly (60) is configured to raise and lower carriages (20) in accordance with the description herein by producing mechanical energy that is translated to a lifting motion of the carriages (20) through a mechanical linkage, hydraulic system, other systems, or any combination thereof as will be apparent to one skilled in the art in view of the teachings herein. Therefore, drive assembly (60) may include any number of suitable components to raise and lower carriages (20) in accordance with the description herein.

During exemplary use, the operator may place a vehicle between lift posts (12, 14) with carriages (20) at or near the lowered position. Next, the operator may suitably align carriages (20) with a frame of the vehicle. When carriages (20) have been suitably positioned such that arm adapters (100) are aligned with the frame of the vehicle, the operator may utilize control assembly (50) in order to active drive assembly (60) to synchronously raise carriages (20) such that arm adapters (100) engage the frame and thereby lift the vehicle. Once carriages (20) lift the vehicle to a desired height, the operator may utilize control assembly (50) to instruct drive assembly (60) to stop raising carriages (20). In some instances, a vertical lockout assembly may be used to ensure carriages (20) remain locked at the desired height along lift posts (12, 14).

Once the operator desires to lower vehicle, the operator may utilize control assembly (50) in order to activate drive assembly (60) to synchronously lower carriages (20) such the vehicle is lowered to the ground and arm adapters (100) disengage the frame of the vehicle. With arm adapters (100) disengaged from the frame of the vehicle, the vehicle may be removed from the lifting area, and another vehicle may be subsequently moved into the lifting area for service.

II. Exemplary Active Arm Adapter for Frame-Engaging Lift

Previously, in some instances, one type of arm adapter may not have been suitable for a specific type of vehicle frame. For instances, a flat rubber pad adapter may not be suitable for a truck frame with a slick undercoating, as the truck frame may slip out of suitable contact with the flat rubber pad during work on the truck. As another example, an arm adapter with rigid frame constraining ears that is suitable for a truck frame may not have the appropriate geometry to suitably engage a unibody frame. Therefore, previously, an operator had to install a first set of arm adapters on a frame-engaging lift to suitably lift a first vehicle, and then replace those adapters with a second set of arm adapters to suitably lift a second vehicle.

Attaching and detaching multiple types of arm adapters with a frame-engaging lift may become time-consuming, undesirably reducing productivity of the technician and profitability of the frame-engaging lift. Utilizing multiple types of arm adapters on a frame-engaging lift may be undesirably expensive, as multiple arm adapters must be purchased to lift various types of vehicle frames and stored when not in use. Additionally, in some instances, the wrong arm adapter may be inadvertently used to lift a vehicle having a specific frame.

Therefore, it may be desirable to have an arm adapter that may transition between a first configuration and a second configuration; where the first configuration is designed to suitably engage a first subset of vehicle frames, and the second configuration is designed to suitably engage a second subset of vehicle frames. Additionally, it may be desirable to have an arm adapter that automatically transitions between the first configuration and the second configuration, depending on what type of vehicle frame the arm adapter engages during exemplary use.

A. Arm Adapter with Automatic Pivoting Actuation

Figure 2:
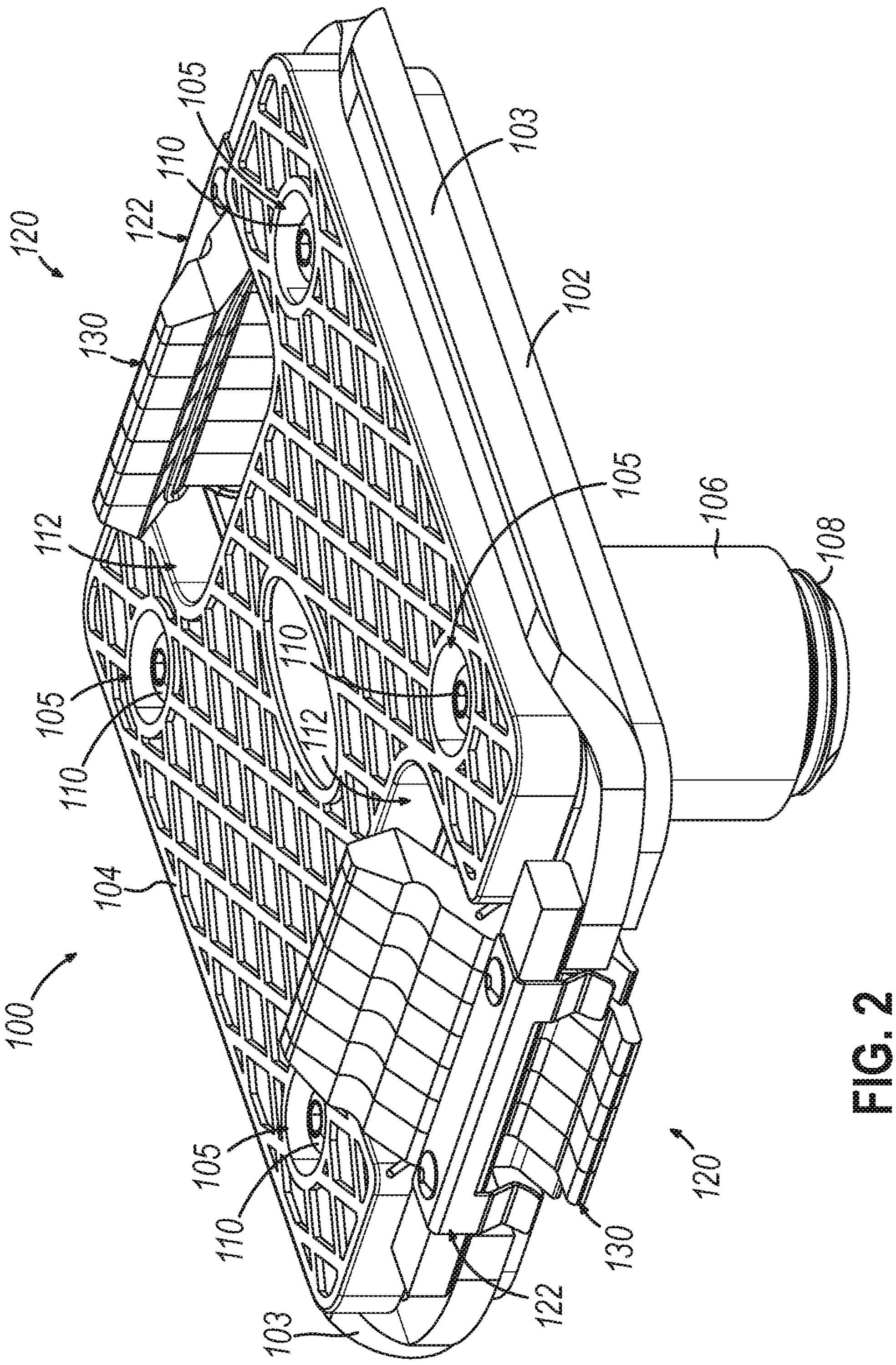
FIG. 2 is a perspective view of an arm adapter of the two-post lift assembly of FIG. 1A having an adjustable frame retaining assembly.
Figure 3:
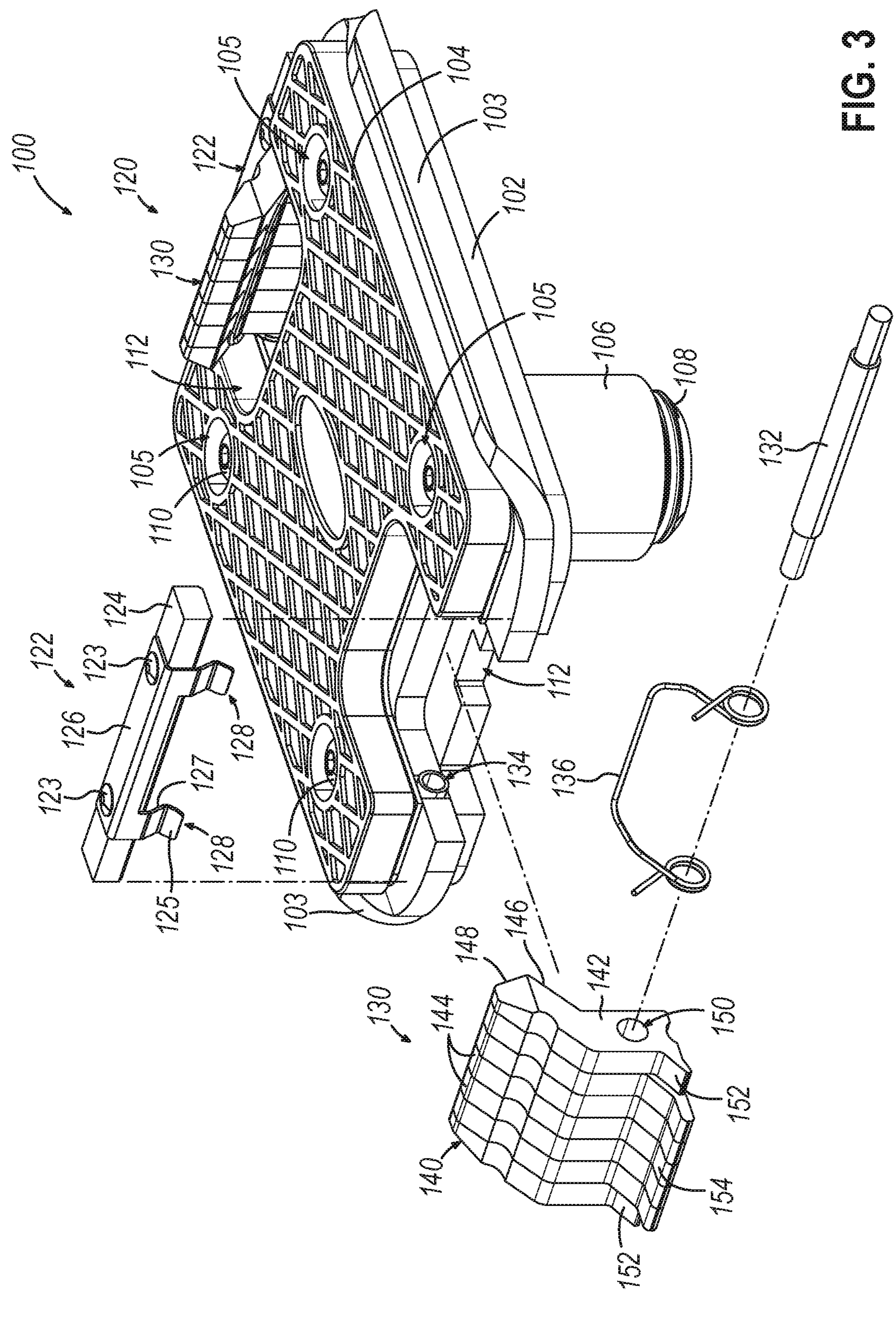
FIG. 3 is an exploded perspective view of the arm adapter of FIG. 2.
Figure 4:
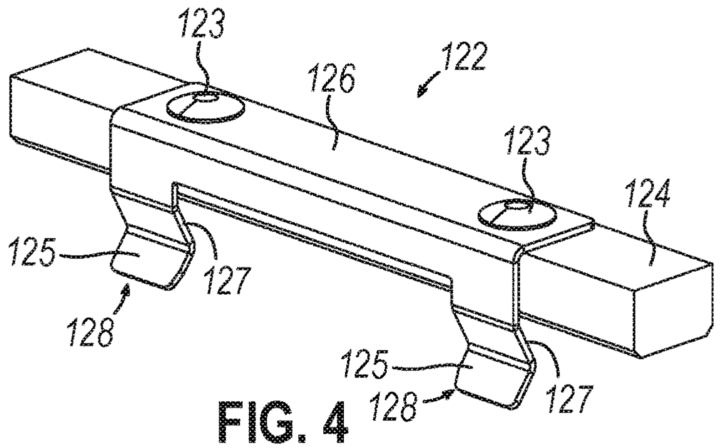
FIG. 4 is a perspective view of a latch assembly of the adjustable frame retaining assembly of FIG. 2.
Figure 5:
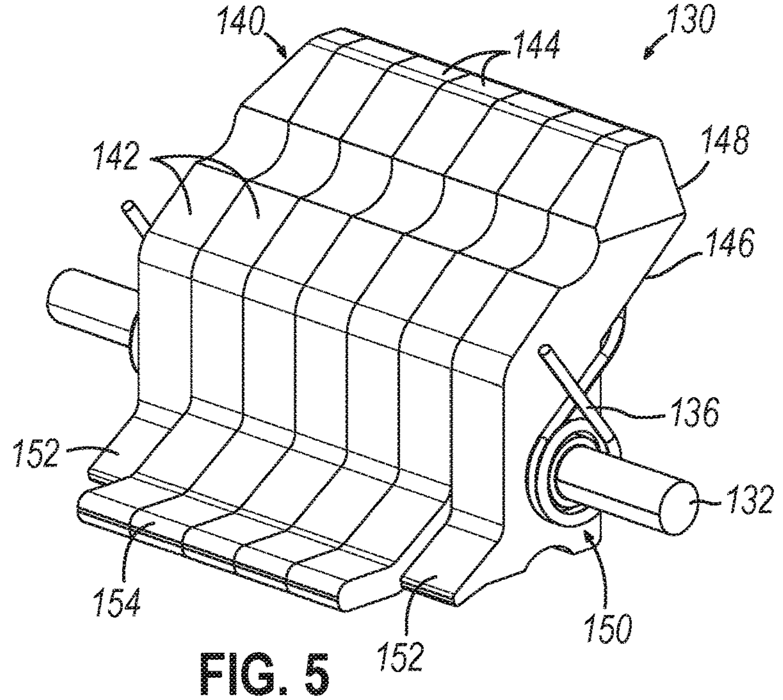
FIG. 5 is a perspective view of a retractable ear assembly of the adjustable frame retaining assembly of FIG. 2.
Figure 6:
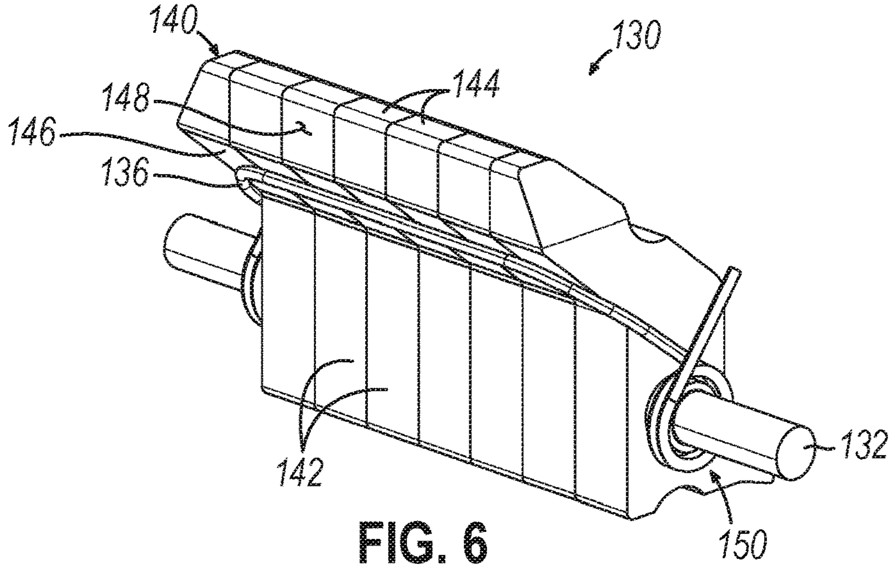
FIG. 6 is another perspective view of the retractable ear assembly of FIG. 5.

FIGS. 2-3 show arm adapter (100) of two-post lift (10) described above. While the current example envisions arm adapter (100) used in conjunction with two-post lift (10), arm adapter (100) may be used with any suitable vehicle lift as would be apparent to one skilled in the art in view of the teachings herein.

Figure 8A:
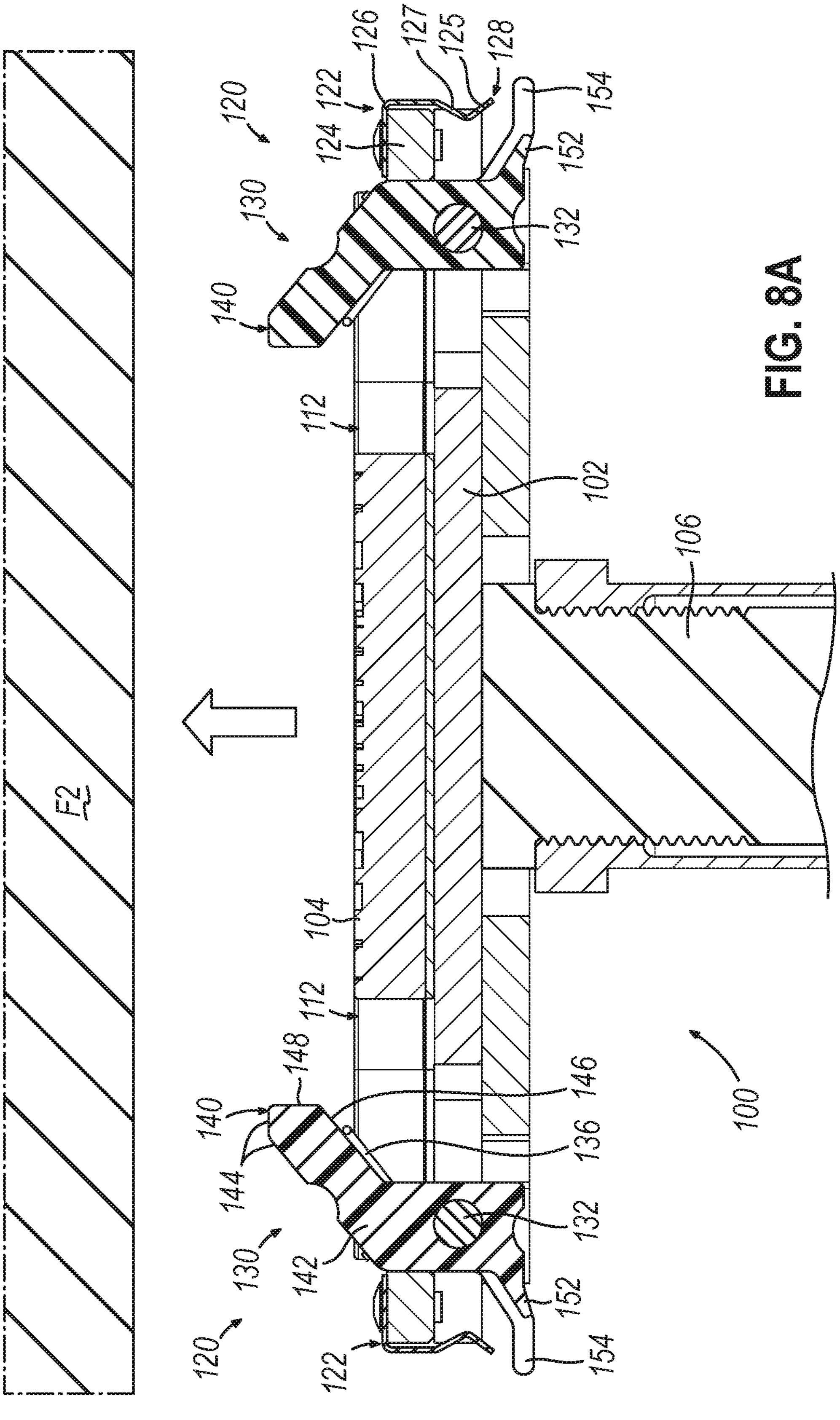
FIG. 8A is a cross-sectional view of the arm adapter of FIG. 2 directly under a portion of a unibody frame, with the adjustable frame retaining assembly in the extended configuration.
Figure 8B:
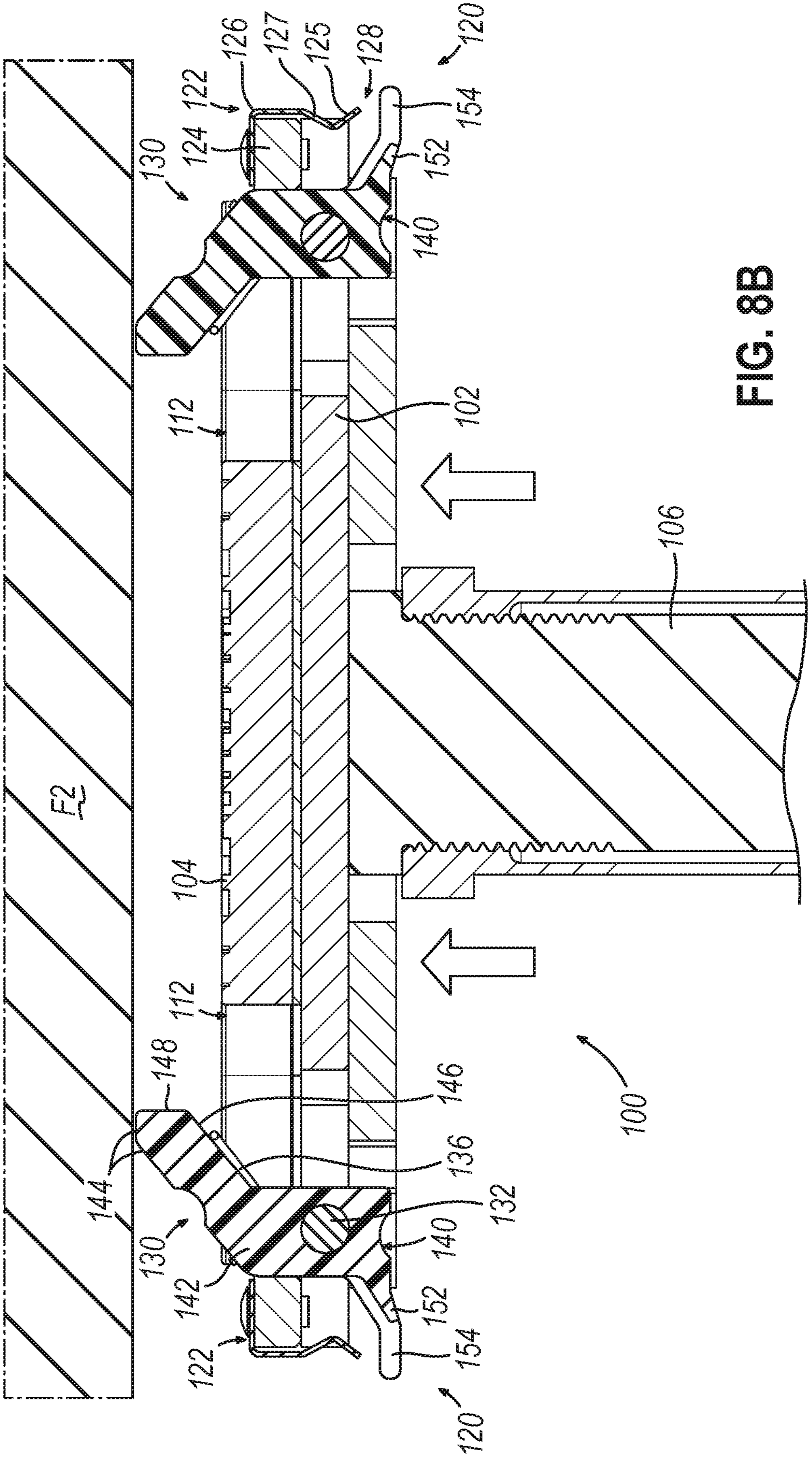
FIG. 8B is a cross-sectional view of the arm adapter of FIG. 2 directly under a portion of the unibody frame of FIG. 8A, with the adjustable frame retaining assembly in the extended configuration, with the retractable ear assembly of FIG. 5 initially in contact with the unibody frame.
Figure 8D:
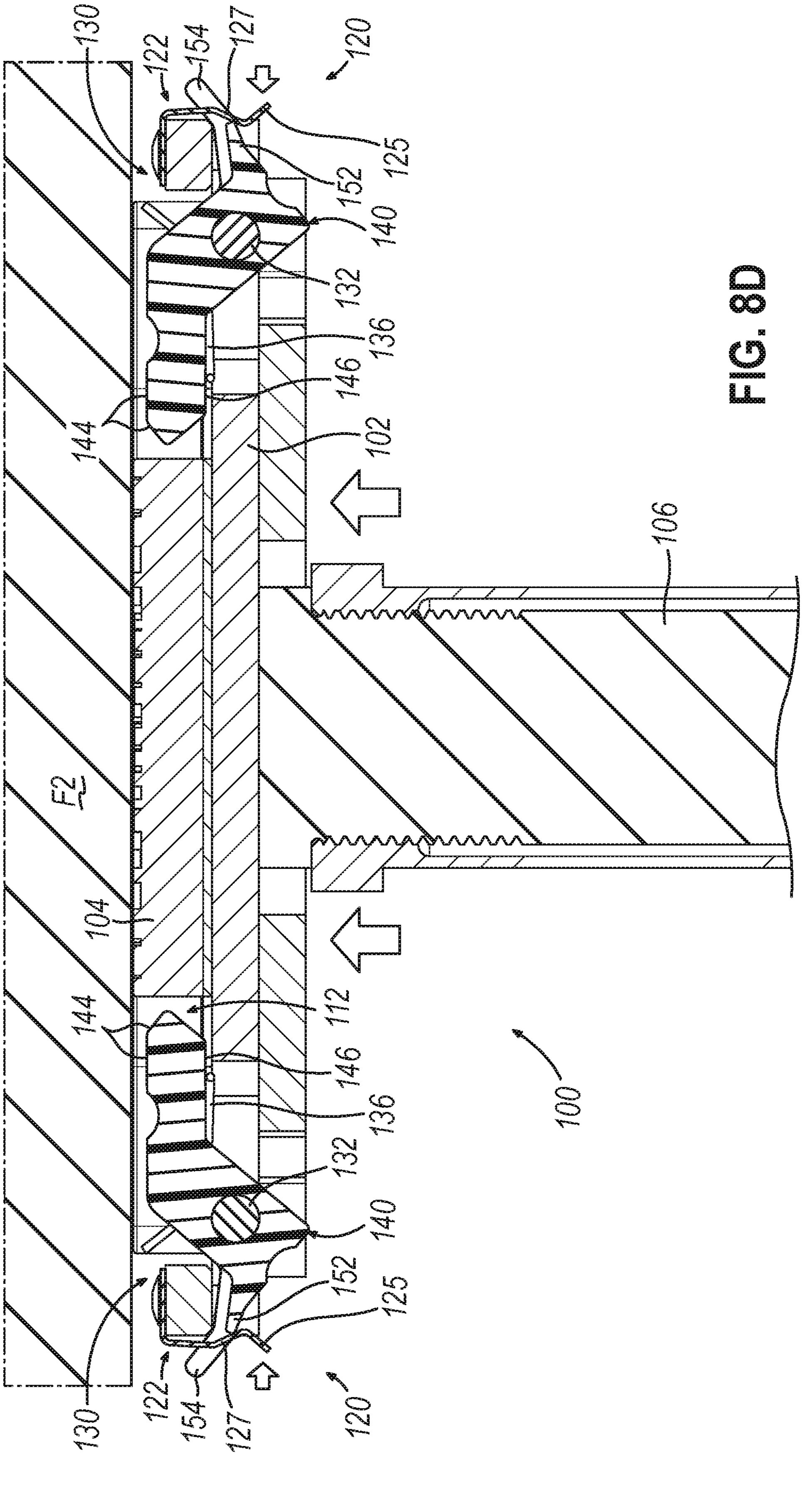
FIG. 8D is a cross-sectional view of the arm adapter of FIG. 2 engaged and lifting the unibody frame of FIG. 8A, with the adjustable frame retaining assembly in the retracted configuration.
Figure 9A:
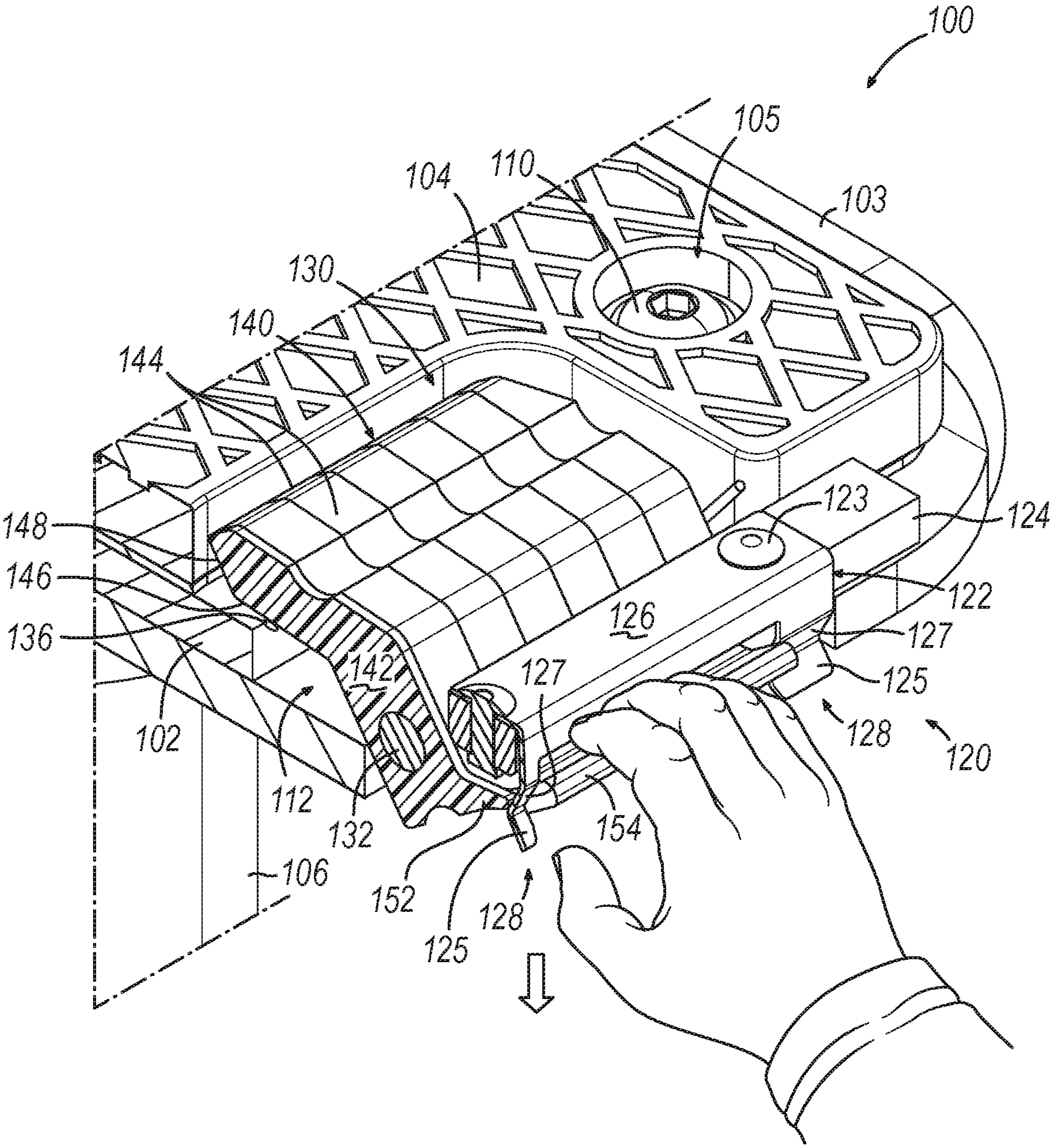
FIG. 9A is a perspective sectional view of the arm adapter of FIG. 2 in the retracted configuration, with an operator initially pulling downward on a lever projection of the retractable ear assembly of FIG. 5.

Arm adapter (100) includes a support platform (102), a vehicle engagement pad (104), a base member (106), and a pair of adjustable frame retaining assemblies (120). As will be described in greater detail below, adjustable frame retaining assemblies (120) are configured to actuate between an extended configuration (as shown in FIG. 2) and a retracted configuration (as shown in FIGS. 8D and 9A) to accommodate various types of vehicle frames without having to replace arm adapters (100) from two-post lift (10).

Support platform (102) supports vehicle engagement pad (104). In the current example, support platform (102) includes a pair of lips (103) that at least partially house vehicle engagement pad (104). Vehicle engagement pad (104) defines a plurality of counterbores (105), each housing a respective pad fastening member (110). Pad fastening members (110) selectively couple vehicle engagement pad (104) with support platform (102) such that, while coupled, vehicle engagement pad (104) is fixed relative to support platform (102).

Vehicle engagement pad (104) is configured to engage the frame of a vehicle during exemplary use of arm adapter (100) in conjunction with a frame-engaging vehicle lift, such as two-post lift (10). Vehicle engagement pad (104) is made of a sufficient material to engage and support a vehicle frame without damaging the vehicle frame. Vehicle engagement pad (104) may be formed from any suitable material as would be apparent to one skilled in the art in view of the teachings herein.

Vehicle engagement pad (104) may be replaceable relative to the rest of arm adapter assembly (100), such that a worn vehicle engagement pad (104) may be replaced with a new vehicle engagement pad (104). In particular, vehicle engagement pad (104) may be replaced by removing pad fastening members (110), removing a used vehicle engagement pad (104), placing a new vehicle engagement pad (104) on support platform (102), and then recoupling pad fastening members (110) to the new vehicle engagement pad (104) and support platform (102).

Support platform (102) and vehicle engagement pad (104) together define a pair of recessed pockets (112) located on opposite ends of arm adapter assembly (100). Recessed pockets (112) are dimensioned to operatively house a respective retractable ear assembly (130) of adjustable frame retaining assemblies (120). In particular, recessed pockets (112) provide an adequate amount of space to allow retractable engagement ear assemblies (130) to actuate between the extended configuration and the retracted configuration in accordance with the description herein.

Base member (106) extends away from the underside of support platform (102) such that base member (106) extends away from vehicle engagement pad (104). Base member (106) terminates into a coupling (108). Coupling (108) is configured to selectively couple arm adapter assembly (100) with adapter coupling end (28) of lifting carriages (20). Therefore, coupling (108) allows an operator to attach arm adapter assembly (100) to two-post lift (10) for exemplary use, as well as remove arm adapter assembly (100) from two-post lift (10). Base member (106) may be dimensioned to be partially housed within adapter coupling end (28) in order to operatively couple arm adapter assembly (100) with two-post lift (10). In the current example, coupling (108) includes a male threading. However, this is merely optional, as coupling (108) may include any suitable feature to selectively couple adapter arm assembly (100) with adapter coupling end (28) as would be apparent to one skilled in the art in view of the teachings herein.

As mentioned above, and as will be described in greater detail below, adjustable frame retaining assemblies (120) are configured to actuate between an extended configuration (as shown in FIG. 2) and a retracted configuration (as shown in FIGS. 8D and 9A) in order to accommodate various types of vehicle frames without having to replace arm adapters (100) from two-post lift (10). Additionally, as will be described in greater detail below, frame retaining assemblies (120) of the current example are configured to actuate from the extended configuration into the retracted configuration, ready to engage a vehicle frame that may call for frame retaining assemblies (120) to be in the retracted configuration for suitable engagement.

Each frame retaining assembly (120) includes a latch assembly (122) and a retractable ear assembly (130). Retractable ear assembly (130), while in the extended configuration, is configured to constrain certain vehicle frames from disassociating with vehicle engagement pad (104) during exemplary use. Retractable ear assembly (130), while in the retracted configuration, is configured to accommodate the engagement between certain vehicle frames and vehicle engagement pad (104) without damaging the frame or otherwise obstructing the interaction between vehicle engagement pad (104) and the frame.

Latch assembly (122) is configured to selectively retain retractable ear assembly (130) in the retracted configuration. Latch assembly (122) includes a support bar (124) and a latch body (126) coupled to support bar (124) via coupling bodies (123). Support bar (124) is fixed to support platform (102) such that support bar (124) extends across a portion of a corresponding recessed pocket (112). As best seen in FIGS. 8A-8B, support bar (124) abuts against a portion of retaining ear bodies (142) while ear assembly (140) is in the extended position.

Latch body (126) includes a pair of resilient latches (128) extending downward from support bar (124). As will be described in greater detail below, resilient latches (128) are dimensioned to interact with latching projections (152) of ear assembly (140) in order to selectively latch ear assembly (140) in the retracted position. Resilient latches (128) also define a lateral gap between each other that houses a lever projection (154), as will be described in greater detail below.

Each resilient latch (128) includes a first surface (125) and a second surface (127) that form an angle relative to each other. First surface (125) is dimensioned to initially contact latching projections (152) as ear assembly (140) actuates from the extended position to the retracted position in order to force resilient latches (128) outward, thereby accommodating actuation of latching projections (152). Second surface (127) is dimensioned to abut again latching projections (152) while ear assembly (140) is in the retracted position such that ear assembly (140) is prevented from inadvertently returning to the extended position. Each resilient latch (128) is sufficiently resilient to bend in order to accommodate actuation of latching projections (152). However, resilient latches (128) have a sufficient spring constant to resist bending in response to latching projections (152) abutting against second surface (127) due to the forces provided by biasing spring (136), as will be described in greater detail below.

Retractable ear assembly (130) includes a pivoting support rod (132) coupled to support platform (102) via a pair of pivot couplings (134), a bias spring (136), and an ear assembly (140) including a plurality of retaining ear bodies (142). Pivot couples (134) are associated with sections of support platform (102) defining recessed pockets (112). Pivoting support rod (132) extends between pivot couplings (134) within a respective recessed pocket (112).

Bias spring (136) includes two ends that are coupled with pivoting support rod (132), and a connecting member that contacts against a bias spring engagement surface (146) of retaining ear bodies (142). As best shown in FIG. 3, the connecting member extends between the two ends coupled with support rod (132). Bias spring (136) provides a biasing force against retaining ear bodies (142) to urge retaining ear bodies (142) to pivot about the axis defined by rod (132) toward the extended position. In the current example, bias spring (136) includes a torsion spring; however, any other suitable biasing member may be used as would be apparent to one skilled in the art in view of the teachings herein.

Ear assembly (140) includes an array of retaining ear bodies (142). Each retaining ear body (142) includes a frame contact surface (144), bias spring engagement surface (146), and a frame retaining surface (148). Interior ear bodies (142) of the array include a lever projection (154), while the exterior ear bodies (142) of the array include a latching projection (152). While in the current example an array of retaining ear bodies (142) form the overall shape of ear assembly (140), a singular piece of material may be used to form all the components of ear assembly (140).

Additionally, each retaining ear body (142) defines a pivot through hole (150) dimensioned to house support rod (132). In particular, pivot through holes (150) are dimensioned to house support rod (132) such that retaining ear bodies (142) may pivot about an axis defined by support rod (132). Therefore, an operator may pivot retaining ear bodies (142) by hand between the extended configuration and the retracted configuration.

As mentioned above, bias spring engagement surface (146) is configured to engage bias spring (136) such that bias spring (136) may urge retaining ear bodies (142) to pivot about the axis defined by support for (132) toward the extended configuration. In particular, as shown in FIGS. 8A-8B, bias spring (136) biases retaining ear bodies (142) to pivot against support bar (124), which in turn supports retaining ear bodies (142) in the extended configuration. In other words, due to the presence of support bar (124), bias spring (136) may not over-rotate retaining ear bodies (142) past the extended configuration in the rotational direction opposite from the retracted configuration.

Due to the retractable nature of retaining ear bodies (142), arm adapter assembly (100) may suitably accept a first subset of vehicle frames (F1) while retaining ear bodies (142) are in the extended configuration; while arm adapter assembly (100) may suitably accept a second subset of vehicle frames (F2) while retaining ear bodies (142) are in the retracted configuration.

While in the extended position, frame retaining surfaces (148) of each ear assembly (140) are configured to form a lateral boundary. As will be described in greater detail below, this lateral boundary may prevent a first subset of vehicle frames (F1), such as truck frames with a slick undercoating, from slipping out of engagement with vehicle engagement pad (104) during example use.

As mentioned above, an operator may pivot retaining ear bodies (142) by hand between the extended configuration and the retracted configuration. As will be described in greater detail below, retaining ear bodies (142), while in the retracted configuration, are configured to accommodate the engagement between a second subset of vehicle frames (F2) and vehicle engagement pad (104) without damaging the frame or otherwise obstructing the interaction between vehicle engagement pad (104) and the frame.

As best shown in FIGS. 2, 7A-7B, and 8A-8B, the portion of each retaining ear body (142) forming surfaces (144, 146, 148) extends at an angle from pivot through hole (150) toward the center of arm adapter assembly (100) (while in the extended position). As will be described in greater detail below, the angle formed by retaining ear bodies (142) allows frame contact surfaces (144) to engage a second subset of vehicle frames (F2) in order to pivot ear assembly (140) from the extended position to the retracted position during exemplary use. Therefore, in some instances the operator may not have to pivot retaining ear bodies (142) by hand into the retracted configuration. Instead, the act of lifting a vehicle with a vehicle frame (F2) may automatically pivot retaining ear bodies (142) into the retracted position.

Figure 7A:
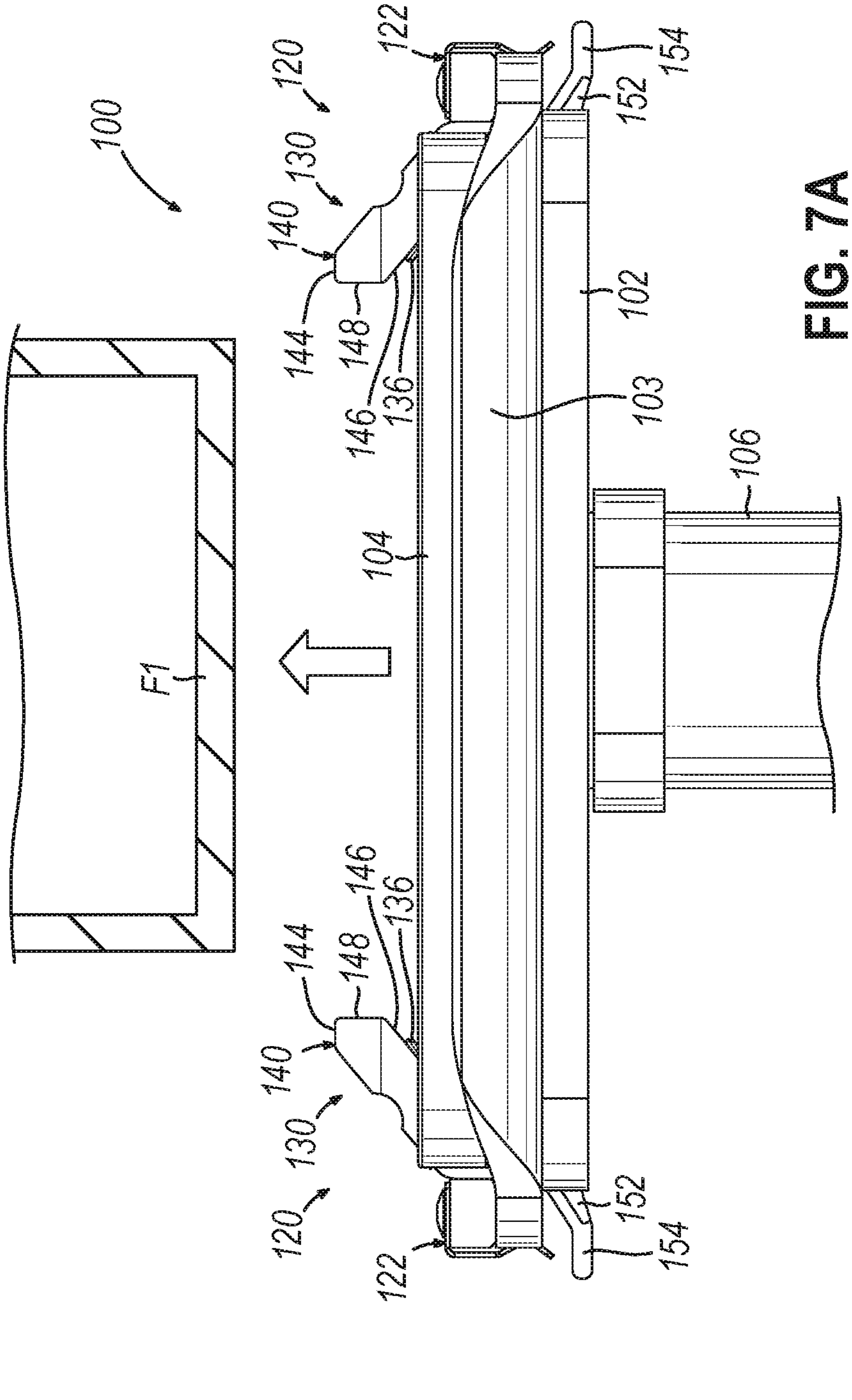
FIG. 7A is an elevational front view of the arm adapter of FIG. 2 directly under a portion of a truck frame, with the adjustable frame retaining assembly in an extended configuration.
Figure 7B:
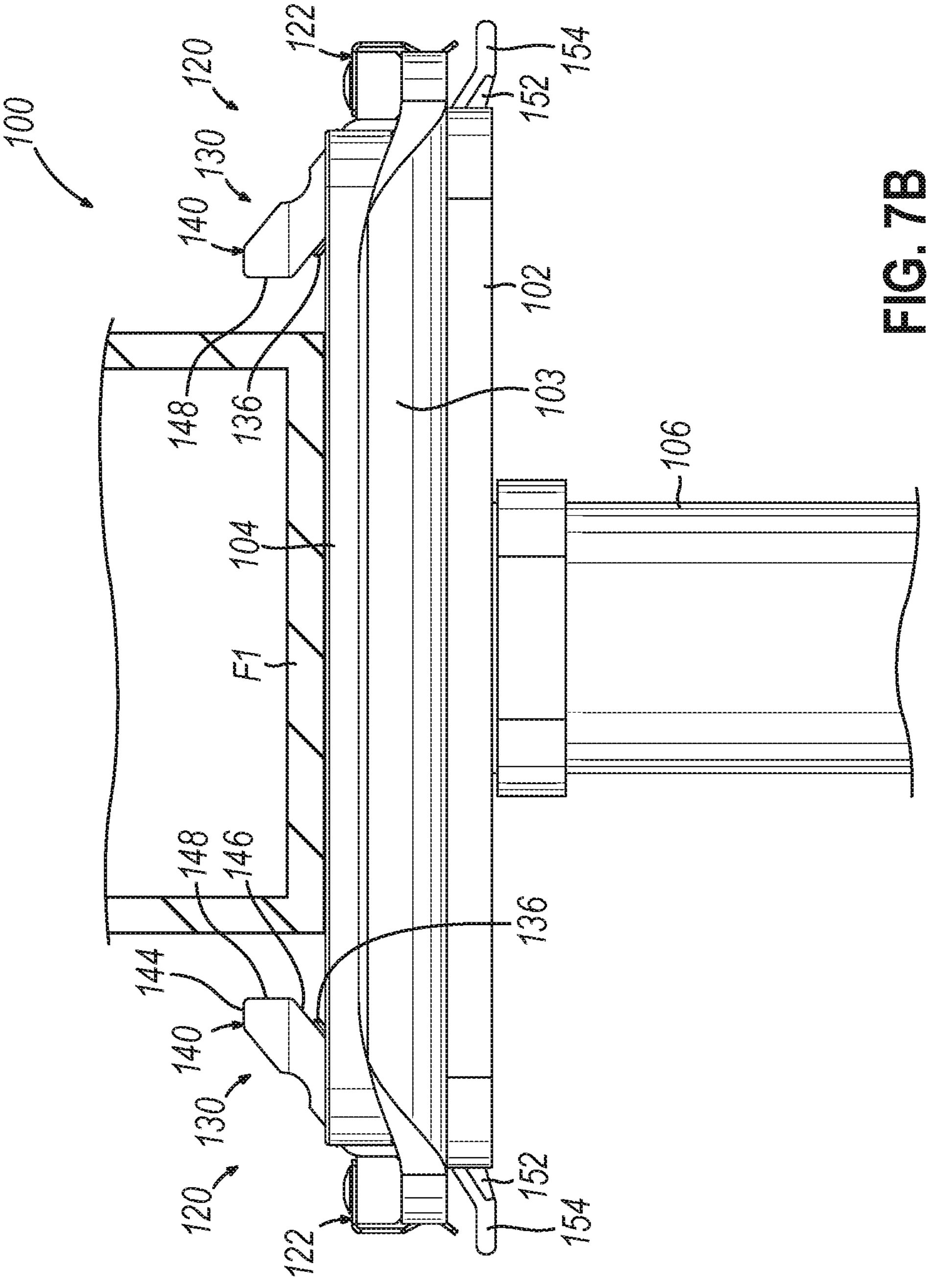
FIG. 7B is an elevational front view of the arm adapter of FIG. 2 lifting a portion of the truck frame of FIG. 7A, with the adjustable frame retaining assembly in the extended configuration.

FIGS. 7A-7B show an exemplary use of arm adapter assembly (100) in conjunction with two-post lift (10) in order to lift a first type of vehicle frame (F1), such as a truck frame with a slick undercoating. First, an operator may place a vehicle between lift posts (12, 14). Next, the operator may move adjustable lifting arms (22) such that arm adapter assemblies (100) are adjacent to suitable portions of vehicle frame (F1), as shown in FIG. 7A. It should be understood that vehicle frame (F1) has a width that may fit between the gap defined by frame retaining surfaces (148).

Next, as shown in FIG. 7B, with vehicle frame (F1) suitably aligned with arm adapter assemblies (100), the operator may actuate carriages (20) upward via controls assembly (50) until vehicle engagement pad (104) engages vehicle frame (F1), thereby lifting vehicle frame (F1). With vehicle frame (F1) engaged with pad (104) and positioned between frame retaining surfaces (148), if vehicle frame (F1) slips or otherwise moves laterally, frame (F1) may contact frame retaining surface (148) such that frame retaining surface (148) prevents frame (F1) from falling off vehicle engagement pad (104). Once the operator wishes to lower vehicle frame (F1), the operator may lower carriages (20) in accordance with the description herein. Therefore, arm adapter assembly (100) may be used with a first subset of vehicle frames (F1), such as a truck frame.

FIGS. 8A-8D show an exemplary use of arm adapter assembly (100) in conjunction with two-post lift (10) in order to lift a second type of vehicle frame (F2), such as a pinch weld frame or a unibody frame. First, an operator may place a vehicle between lift posts (12, 14). Next, the operator may move adjustable lifting arms (22) such that arm adapter assemblies (100) are adjacent to suitable portions of vehicle frame (F2), as shown in FIG. 8A.

With arm adapter assemblies (100) adjacent to suitable portions of vehicle frame (F2), the operator may actuate carriages (20) upward via control assembly (50). First, as shown in FIG. 8B, vehicle frame (F2) may make initial contact with frame contact surfaces (144). As shown in FIG. 8B, ear assembly (140) is still in the extended configuration.

Figure 8C:
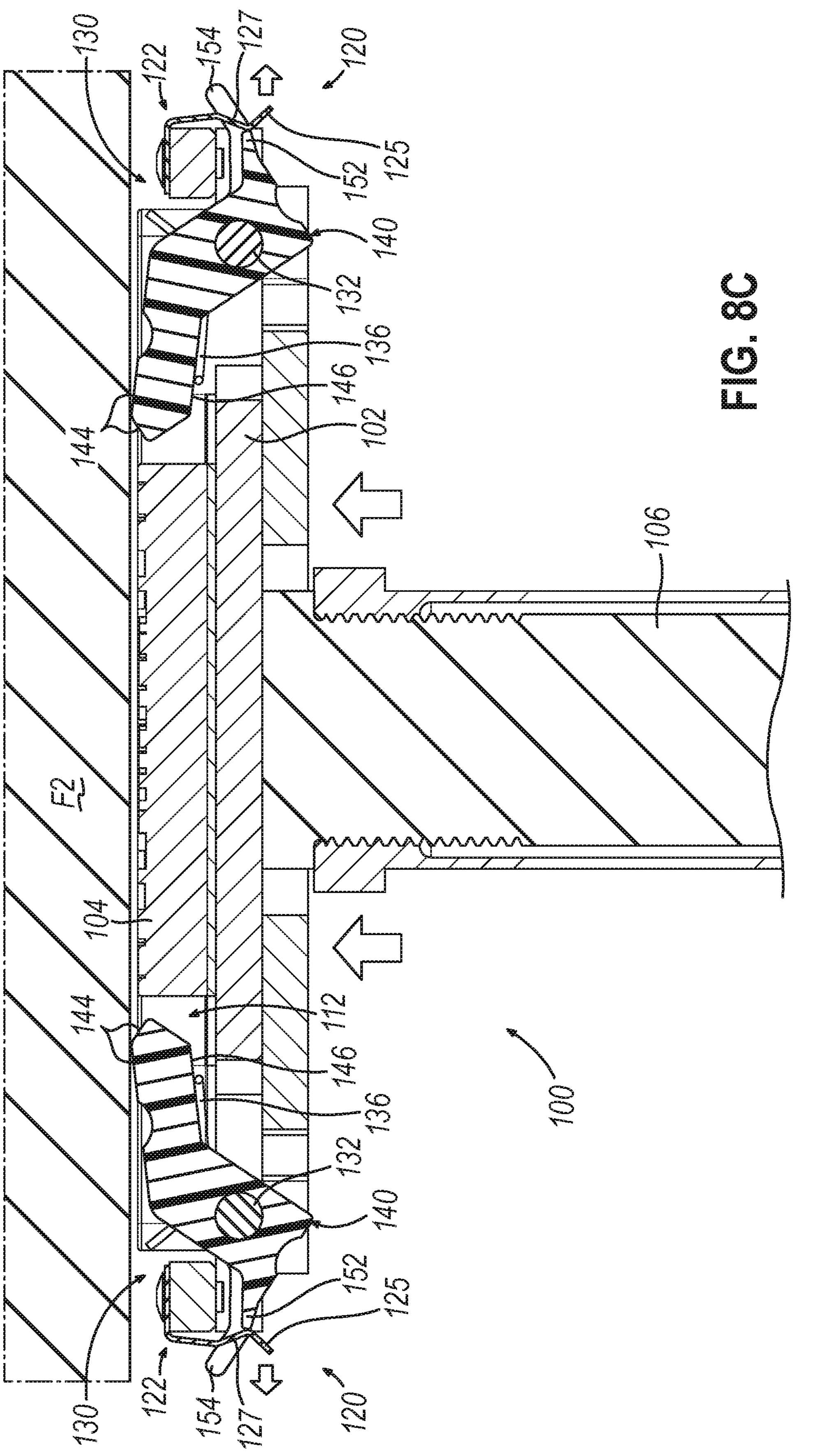
FIG. 8C is a cross-sectional view of the arm adapter of FIG. 2 partially engaged with the unibody frame of FIG. 8A, with the adjustable frame retaining assembly in a partially retracted configuration while the retractable ear assembly of FIG. 5 further contacts the unibody frame.

However, as shown between FIGS. 8B-8C, further upward actuation of carriages (20) forces further contact between vehicle frame (F2) and frame contact surfaces (144). Since frame contact surfaces (144) are laterally offset from the axis defined by support rod (132), contact between vehicle frame (F2) and contact surfaces (144) overcomes the biasing force provided by spring (136) and drives ear assembly (140) to pivot from the extended configuration toward the retracted configuration. Additionally, pivoting of ear assembly (140) toward the retracted configuration causes latching projections (152) to ride against first surface (125) of resilient latches (128), thereby deflecting resilient latches (128) outwardly from the relaxed position (shown in FIGS. 8A-8B) into a flexed position (shown in FIG. 8C). At the position shown in FIG. 8C, vehicle frame (F2) is pivoting ear assembly (140) without yet contacting pad (104).

Next, as shown in FIGS. 8C-8D, further upward actuation of carriages (20) forces further contact between vehicle frame (F2) and frame contact surface (144) until ear assembly (140) is pivoted into the retracted position. With ear assembly (140) in the retracted position, pad (104) may be in suitable engagement with vehicle frame (F2) such that pad (104) supports vehicle frame (F2) for lifting purposes. Additionally, frame contact surface (144) is housed within recessed pocket (112) such that ear assembly (140) does not support vehicle frame (F2) for lifting purposes.

Latching projections (152) are pivoted past first surface (125) of resident latches (128) such that the resilient nature of latches (128) allows latches (128) to actuate from the flexed position shown in FIG. 8C back into the relaxed position shown in FIG. 8D. With latch projections (152) in contact with second surface (127) of latches (128), ear assembly (140) is latched into the retracted configuration, overcoming the bias force of spring (136) in the direction of the extended configuration. In other words, contact between latch projections (152) and second surface (127) while ear assembly is in the retracted position prevents the bias force of spring (136) alone from unlatching ear assembly (140) toward the extended configuration.

Of course, prior to lifting vehicle frame (F2), the operator could manually pivot ear assembly (140) into the latched configuration. Additionally, in some instances, the latch assembly (120) may be completely omitted such that contact between vehicle frame (F2) and frame contact surface (144) keeps ear assembly (140) in the retracted configuration.

Vehicle frame (F2), unlike vehicle frame (F1) described above, does not have a suitable geometry to fit between the gap defined by frame retaining surfaces (148). Therefore, if ear assemblies (140) were not able to actuate into the retracted configuration, contact between ear assemblies (140) and vehicle frame (F2) would prevent pad (104) from suitably engaging vehicle frame (F2), which may in turn damage vehicle frame (F2). Therefore, due to the retractable nature of arm adapter assembly (100), arm adapter assembly (100) may be used with a first subset of vehicle frames (F1), such as a truck frame, as well as a second subset of vehicle frames (F2) such as a pinch weld frame or a unibody frame; such that arm adapter assemblies (100) do not need to be exchanged between lifting both types of vehicle frames (F1, F2).

Figure 9B:
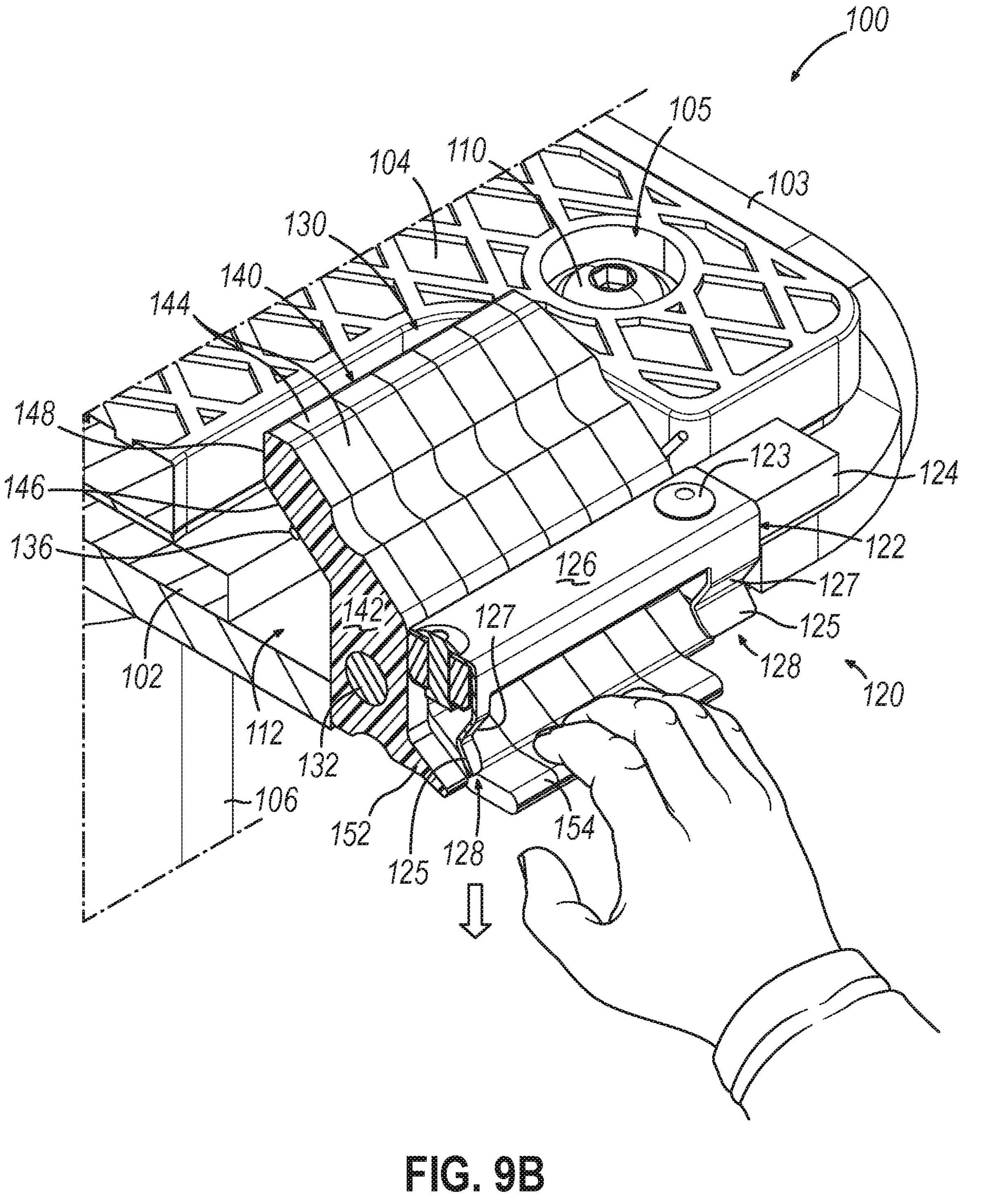
FIG. 9B is a perspective section view of the arm adapter of FIG. 2 actuated out of the retracted configuration into the extended configuration.

Once the operator wishes to lower vehicle frame (F2), the operator may lower carriages (20) in accordance with the description herein. As best shown in FIGS. 9A-9B, in instances where a latch assembly (120) is used, ear assembly (140) may be still latched in the retracted position even after vehicle frame (F2) has been removed. Therefore, the operator may pull down on lever projections (154) in order to force latch projections (152) out of engagement with resilient latches (128). Then, bias spring (136) may ensure ear assembly (140) is pivoted back into the extended configuration.

B. Arm Adapter with Manual Pivoting Actuation

As mentioned above, the portions of retaining ear bodies (142) forming surfaces (144, 146, 148) extend at an angle from pivot through hole (150) toward the center of arm adapter assembly (100) while arm adapter assembly (100) is in the extended position. Due to this geometry, the operator may not have to pivot retaining ear bodies (142) by hand into the retracted configuration. Instead, the act of lifting a vehicle with a vehicle frame (F2) may automatically pivot retaining ear bodies (142) into the retracted position.

However, as best seen in FIG. 8A, the extended angle that retaining ear bodies (142) form for the purposes of automatically pivoting into the retracted position may decrease the width between frame retaining surfaces (148). Such a decrease in width between frame retaining surfaces (148) may limit the range of sizes of frames (F1) adapter arm may accept. Therefore, in some instances, it may be desirable to have ear retaining bodies (142) that do not form an angle that provides automatic pivoting into the retracted position in order to increase the width between frame retaining surfaces (148).

Figure 10:
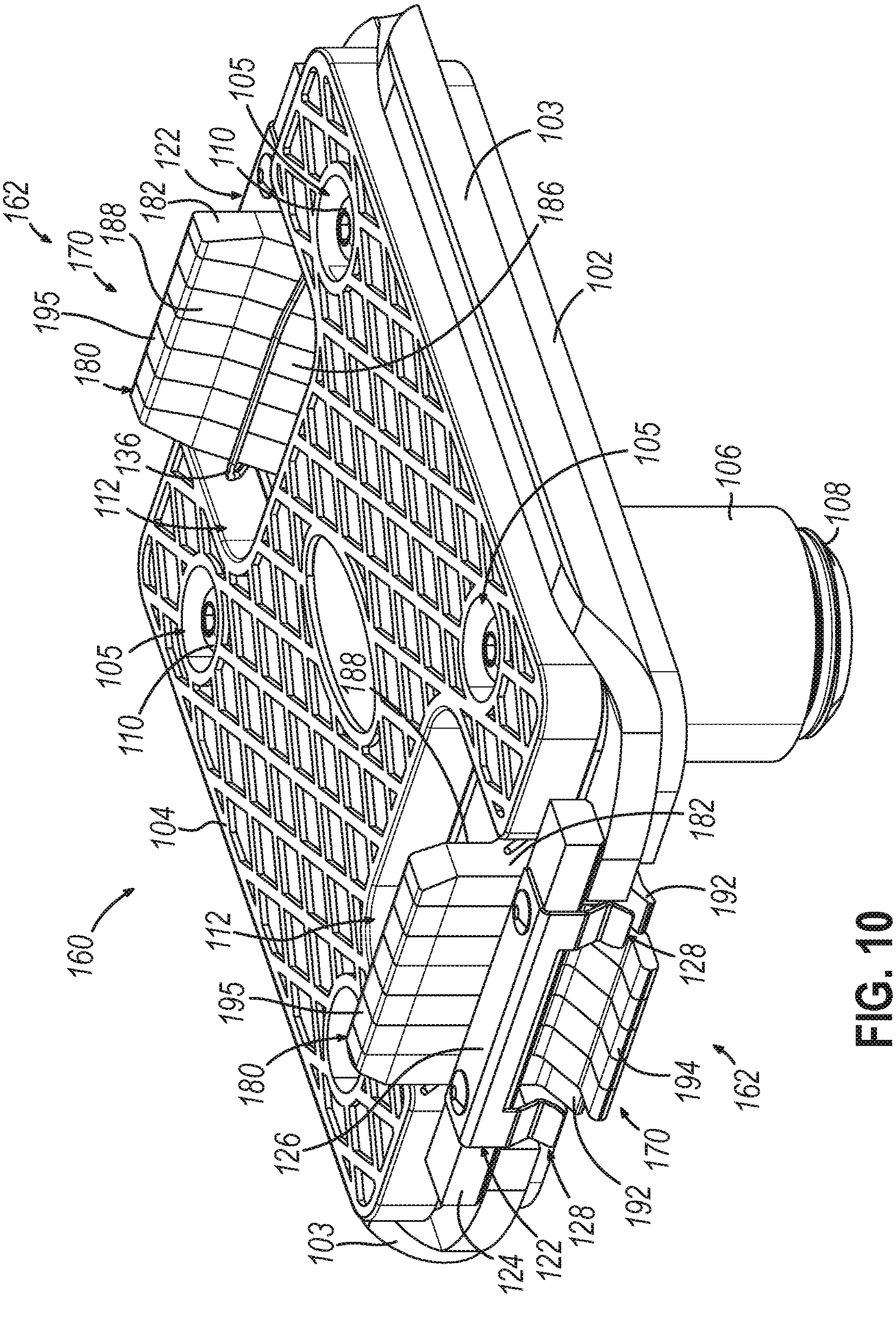
FIG. 10 is a perspective view of another exemplary arm adapter having an adjustable frame retaining assembly, where the arm adapter may be readily incorporated into the two-post lift assembly of FIG. 1A.
Figure 11:
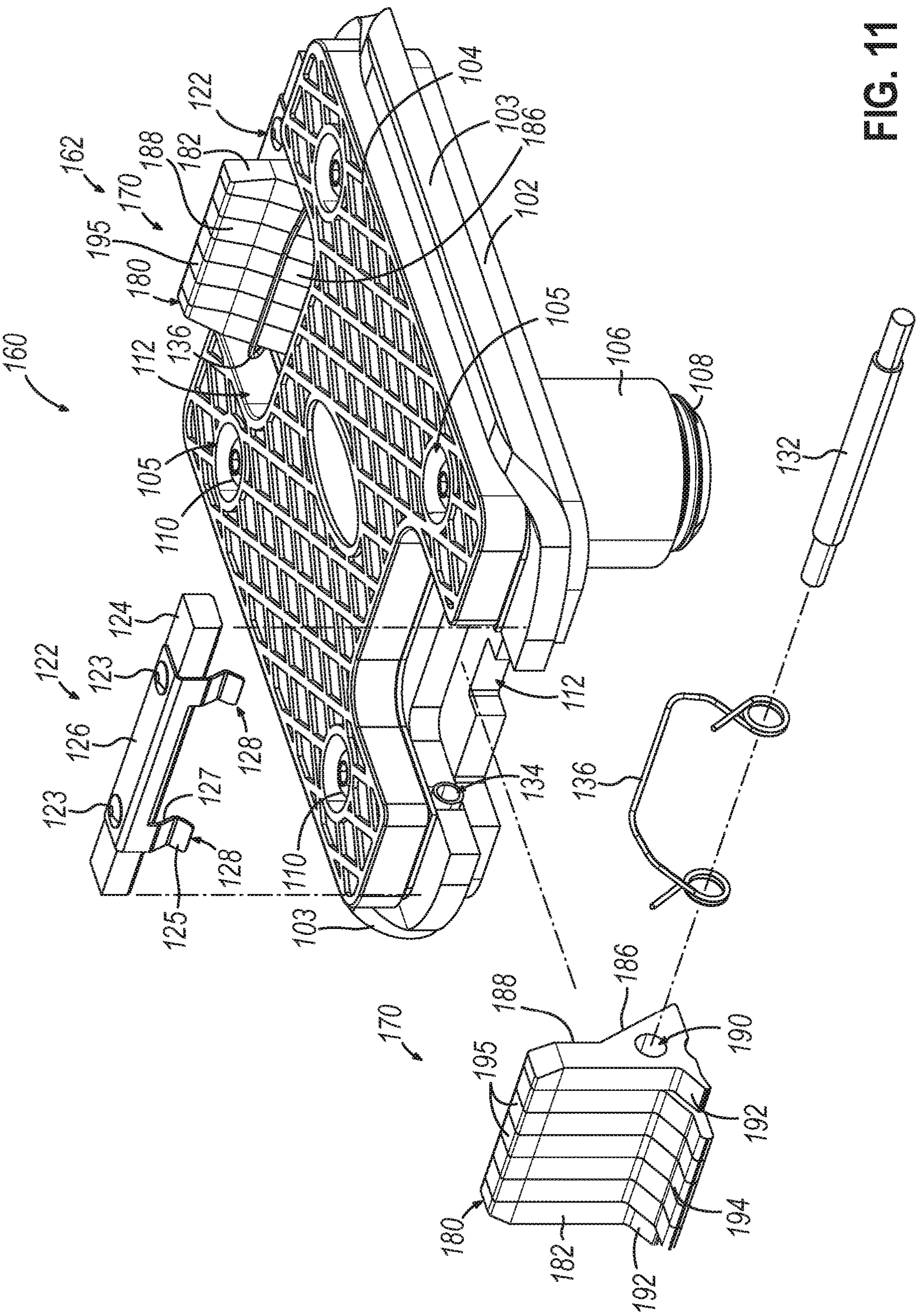
FIG. 11 is an exploded perspective view of the arm adapter of FIG. 10.

FIGS. 10-11 show an exemplary arm adapter assembly (160) that is substantially similar to arm adapter assembly (100) described above, with differences described below. In particular, arm adapter assembly (160) includes a pair of adjustable frame retaining assemblies (162) having retractable ear assembly (170) with a different ear assembly (180). Adjustable frame retaining assemblies (162), retractable ear assembly (170), and ear assembly (180) are substantially similar to adjustable frame retaining assemblies (120), retractable ear assembly (130), and ear assembly (140) described above, with differences elaborated below.

Ear assembly (180) includes an array of retaining ear bodies (182). Each retaining ear body (182) includes a flat planar surface (195), a bias spring engagement surface (186), and a frame retaining surface (188). Bias spring engagement surface (186) may function substantially similar to bias spring engagement surface (146) described above.

Interior ear bodies (182) of the array include a lever projection (194), while the exterior ear bodies (182) of the array include a latching projection (192). Latching projections (182) and lever projection (194) are substantially similar to latching projections (152) and lever projections (154) described above. While in the current example, an array of retaining ear bodies (182) form the overall shape of ear assembly (180), a singular piece of material may be used to form all the components of ear assembly (180).

Additionally, each retaining ear body (182) defines a pivot through hole (190) dimensioned to house support rod (132). In particular, pivot through holes (190) are dimensioned to house support rod (132) such that retaining ear bodies (182) may pivot about an axis defined by support rod (132). Therefore, an operator may pivot retaining ear bodies (182) by hand between the extended configuration and the retracted configuration.

While ear bodies (142) in the previous example included an angled body for purposes of automatically pivot retaining ear bodies (142) into the retracted position, ear bodies (182) of the current example extend substantially vertically upwards to define flat planar surface (195). Therefore, during exemplary use, the operator may have to manually actuate ear assembly (180) into the retracted configuration. However, the gap distance between frame retaining surface (188) may be greater than the gap distance of frame retaining surfaces (148) described above. With a greater gap distance, arm adapter assembly (160) may be able to accept wider vehicle frames (F1) as compared to adapter assembly (100) described above.

In the current example, retaining ear bodies (142, 182) are configured to pivot between the extended configuration and the retracted configuration. However, this is merely optional. In some instances, retaining ear bodies (142, 182) may translate, translate and pivot, or otherwise actuate between the extended configuration and the retracted configuration. Therefore, in some instances, pivoting support rod (132) is not present. In some instances, a guided track may be used to define a pathway for retaining ear bodies (142, 182) to actuate between the extended configuration and the retracted configuration. In such instances, a linear spring may abut against retaining ear bodies (142, 182) to bias retaining ear bodies toward the extended configuration. In some instances, the guided track may cam against retaining ear bodies (142, 182) such that, during actuation of retaining ear bodies (142, 182) relative to the guided track, contact between the guided track and retaining ear bodies (142, 182) pivots or otherwise actuates retaining ear bodies (142, 182) between the extended configuration and the retracted configuration. Of course, any other suitable components may be used to actuate retaining ear bodies (142, 182) between the extended configuration and the retracted configuration as would be apparent to one skilled in the art in view of the teachings herein. Additionally, any other suitable components may be used to latch retaining ear bodies (142, 182) into the retracted configuration as would be apparent to one skilled in the art in view of the teachings herein.

C. Arm Adapter with Automatic Translating Actuation

Figure 12:
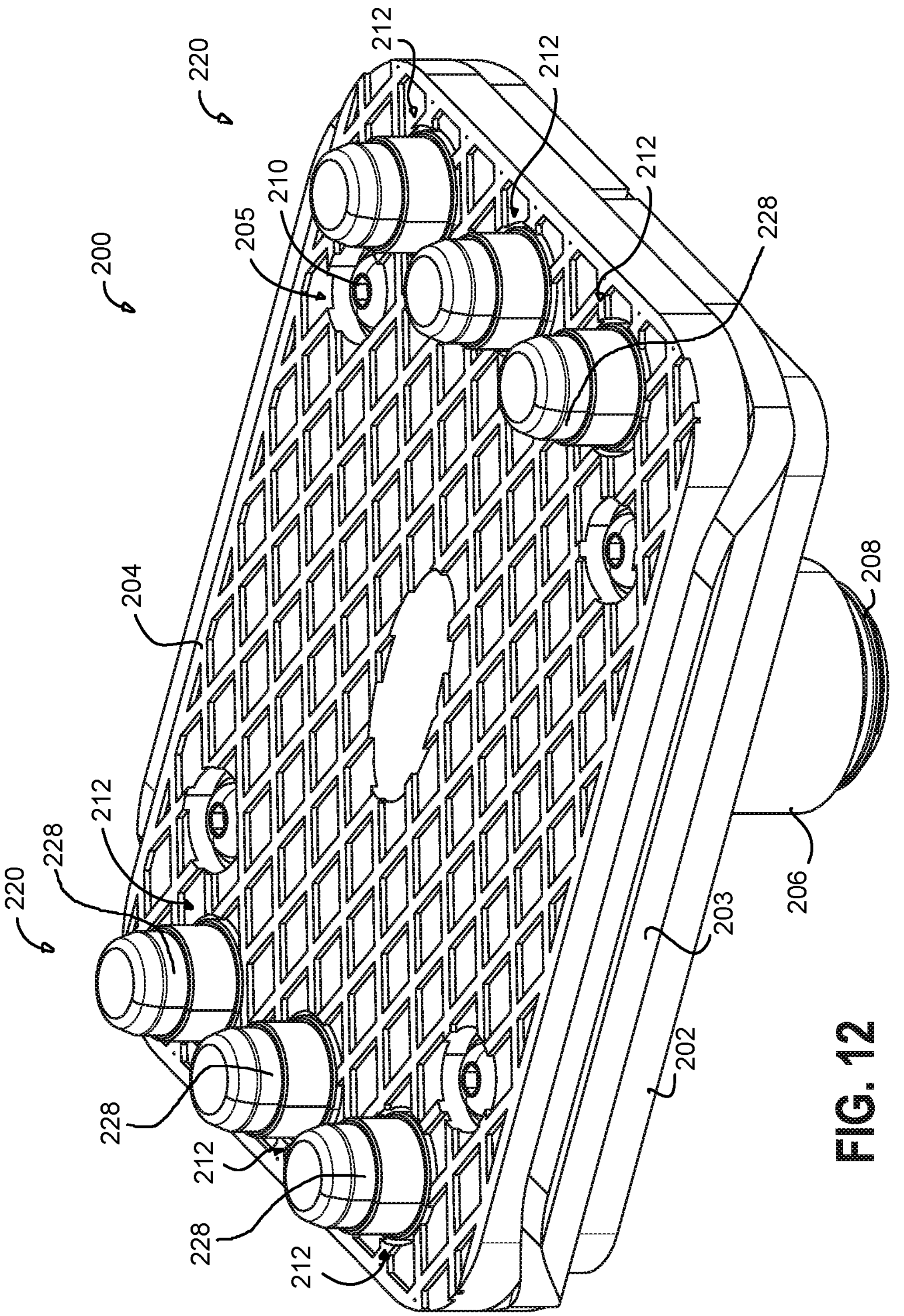
FIG. 12 is a perspective view of another exemplary arm adapter having an adjustable frame retaining assembly, where the arm adapter may be readily incorporated into the two-post lift assembly of FIG. 1A.
Figure 13A:
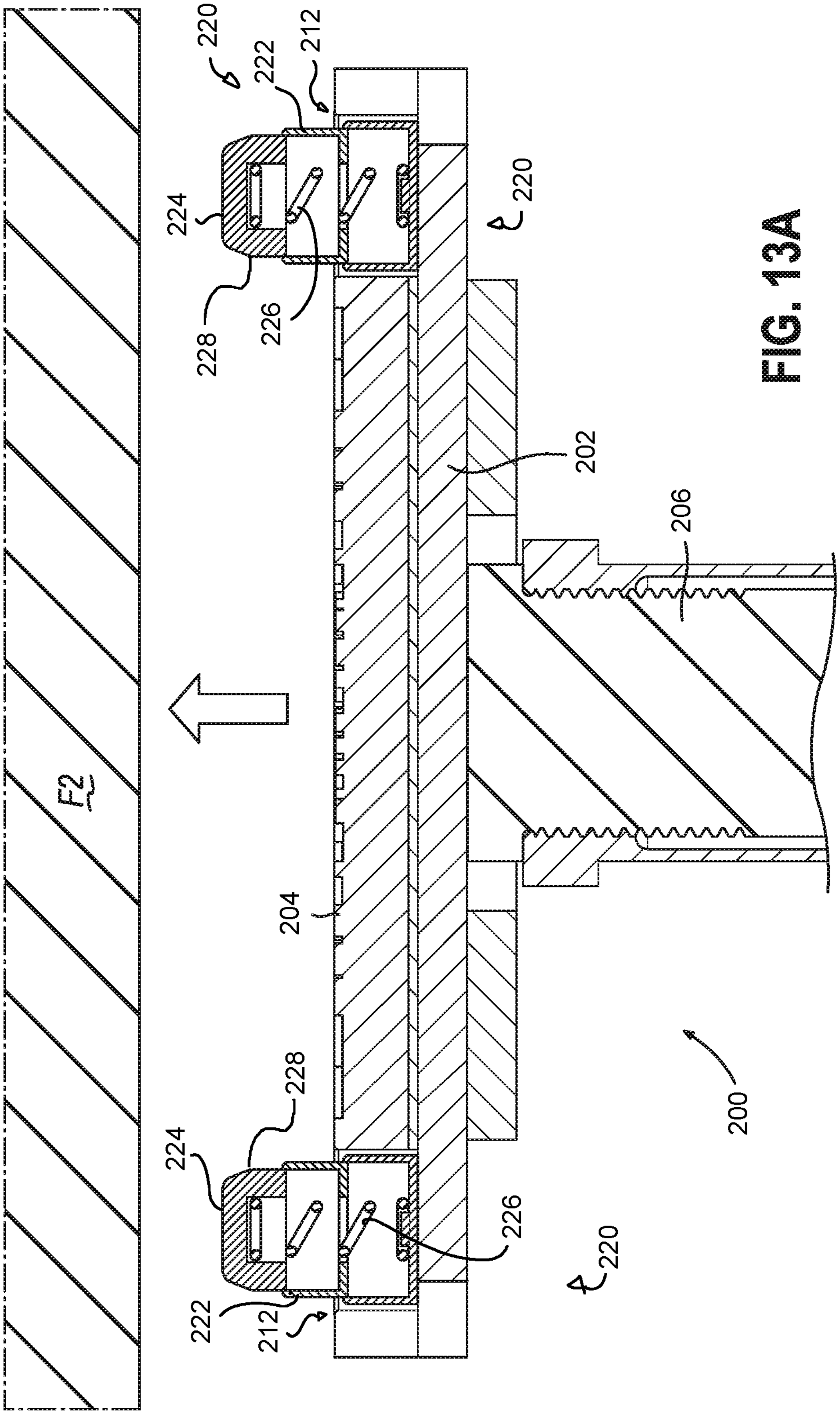
FIG. 13A is a cross-sectional view of the arm adapter of FIG. 12 directly under a portion of a unibody frame, with the adjustable frame retaining assembly in the extended configuration.
Figure 13B:
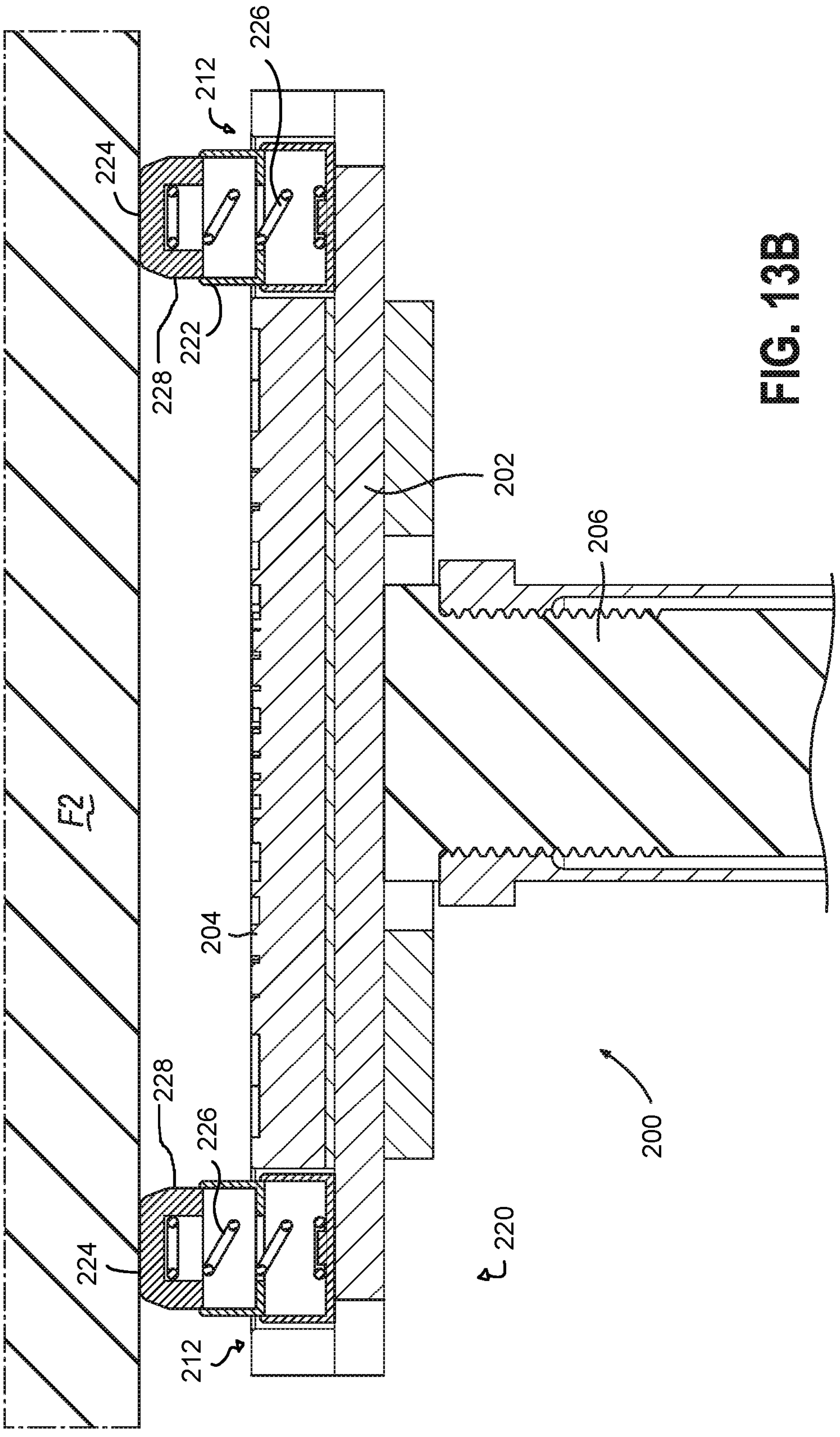
FIG. 13B is a cross-sectional view of the arm adapter of FIG. 12 directly under a portion of the unibody frame of FIG. 13A, with the adjustable frame retaining assembly in the extended configuration and initially in contact with the unibody frame.
Figure 13C:
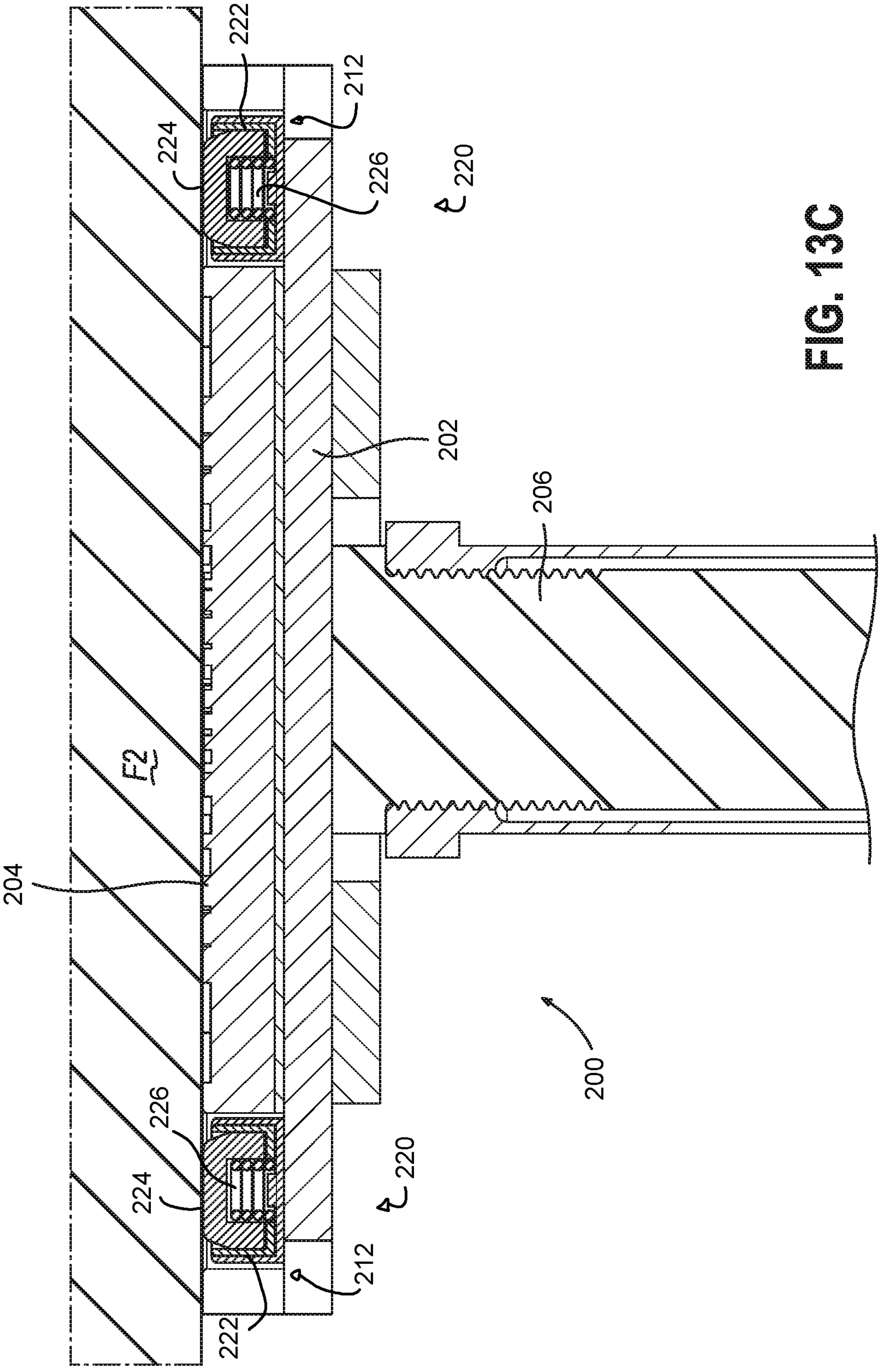
FIG. 13C is a cross-sectional view of the arm adapter of FIG. 12 engaged and lifting the unibody frame of FIG. 13A, with the adjustable frame retaining assembly in the retracted configuration.

FIGS. 12-13C show arm adapter (200) that may be readily incorporated into two-post lift (10) in replacement of arm adapter (100) described above. While the current example envisions arm adapter (200) used in conjunction with two-post lift (10), arm adapter (200) may be used with any suitable vehicle lift as would be apparent to one skilled in the art in view of the teachings herein.

Arm adapter (200) includes a support platform (202), a vehicle engagement pad (204), and a base member (206); which may be substantially similar to support platform (102), vehicle engagement pad (104), and base member (106), described above, respectively, with difference elaborated below. Additionally, arm adapter (200) includes a pair of adjustable frame retaining assemblies (220) that are configured to actuate between an extended configuration (as shown in FIGS. 12-13B) and a retracted configuration (as shown in FIG. 13C) to accommodate various types of vehicle frames without having to replace arm adapters (200) from two-post lift (10).

Support platform (202) supports vehicle engagement pad (204). In the current example, support platform (202) includes a pair of lips (203) that at least partially house vehicle engagement pad (204). Vehicle engagement pad (204) defines a plurality of counterbores (205), each housing a respective pad fastening member (210). Pad fastening members (210) selectively couple vehicle engagement pad (204) with support platform (202) such that, while coupled, vehicle engagement pad (204) is fixed relative to support platform (202).

Vehicle engagement pad (204) is configured to engage the frame of a vehicle during exemplary use of arm adapter (200) in conjunction with a frame-engaging vehicle lift, such as two-post lift (10). Vehicle engagement pad (204) is made of a sufficient material to engage and support a vehicle frame without damaging the vehicle frame. Vehicle engagement pad (204) may be formed from any suitable material as would be apparent to one skilled in the art in view of the teachings herein.

Vehicle engagement pad (204) may be replaceable relative to the rest of arm adapter assembly (200), such that a worn vehicle engagement pad (204) may be replaced with a new vehicle engagement pad (204). In particular, vehicle engagement pad (204) may be replaced by removing pad fastening members (210), removing a used vehicle engagement pad (204), placing a new vehicle engagement pad (204) on support platform (202), and then recoupling pad fastening members (210) to the new vehicle engagement pad (204) and support platform (202).

Vehicle engagement pad (204) defines a plurality of through holes (212) located on opposite ends of arm adapter assembly (200). Though holes (212) are dimensioned to operatively house an alternative retaining ear body, respective retractable body (222) of adjustable frame retaining assemblies (220). In particular, through holes (212) provide an adequate amount of space to allow retractable bodies (222) to actuate between the extended configuration and the retracted configuration in accordance with the description herein. While in the current example, vehicle engagement pad (204) defines through holes (212), support platform (202) may also define a corresponding recessed pocket associated with each through hole (212) to cooperatively house a respective retractable body (222).

Base member (206) extends away from the underside of support platform (202) such that base member (206) extends away from vehicle engagement pad (204). Base member (206) terminates into a coupling (208). Coupling (208) is configured to selectively couple arm adapter assembly (200) with adapter coupling end (28) of lifting carriages (20). Therefore, coupling (208) allows an operator to attach arm adapter assembly (200) to two-post lift (10) for exemplary use, as well as remove arm adapter assembly (200) from two-post lift (10). Base member (206) may be dimensioned to be partially housed within adapter coupling end (28) in order to operatively couple arm adapter assembly (200) with two-post lift (10). In the current example, coupling (208) includes a male threading. However, this is merely optional, as coupling (208) may include any suitable feature to selectively couple adapter arm assembly (200) with adapter coupling end (28) as would be apparent to one skilled in the art in view of the teachings herein.

As mentioned above, and as will be described in greater detail below, adjustable frame retaining assemblies (220) are configured to actuate between an extended configuration (as shown in FIGS. 12 and 13A) and a retracted configuration (as shown in FIG. 13C) in order to accommodate various types of vehicle frames without having to replace arm adapters (200) from two-post lift (10). Additionally, as will be described in greater detail below, frame retaining assemblies (220) of the current example are configured to actuate from the extended configuration into the retracted configuration, ready to engage a vehicle frame that may call for frame retaining assemblies (220) to be in the retracted configuration for suitable engagement.

In particular, frame retaining assemblies (220), while in the extended configuration, are configured to constrain certain vehicle frames from disassociating with vehicle engagement pad (204) during exemplary use. Frame retaining assemblies (220), while in the retracted configuration, are configured to accommodate the engagement between certain vehicle frames and vehicle engagement pad (204) without damaging the frame or otherwise obstructing the interaction between vehicle engagement pad (204) and the frame.

Each frame retaining assembly (220) includes a linear array of retractable bodies (222), each having a corresponding bias spring (226). In the current example, each linear array of retractable bodies (222) includes three retractable bodies (222). However, any suitable number of retractable bodies (222) may be used as would be apparent to one skilled in the art in view of the teachings herein.

Retractable bodies (222) each include a frame contact surface (224) and a retaining surface (228). Frame contact surface (224) is dimensioned to abut against certain types of vehicle frames without damaging said vehicle frame. Retractable bodies (222) are configured to vertically linearly actuate between the extended configuration and the retracted configuration, while biasing springs (226) are configured to bias retractable bodies (222) to the extended configuration.

In the current example, each retractable body (222) includes a vertical array of telescoping bodies that are configured to actuate relative to each other between the extended configuration and the retracted configuration. In the extended configuration, the telescoping bodies are spaced away from each other; while in the retracted configuration, the telescoping bodies are housed within corresponding telescoping bodies. Biasing springs (226) are housed within each retractable body (222) and are coupled to opposing ends of telescoping bodies. Biasing springs (226) thereby biasing a top end of retractable body (222) having frame contact surface (224) away from the base of retractable body (222) resting against pad support platform (202). Retaining surfaces (228) are dimensioned to be supported by retractable bodies (222) and, when the retractable body (222) is in the extended configuration, contain certain types of vehicle frames. When the retractable body (222) is in the retracted configuration to accommodate certain other types of vehicle frames, the retaining surfaces (228) do not contact the other vehicle frames, though other portions of the same structure (in this example, frame contact surfaces (224)) do contact those other vehicle frames.

The telescoping nature of each retractable body (222) is merely optional. Retractable bodies (222) may transition between the extended configuration and the retracted configuration through any suitable means as would be apparent to one skilled in the art in view of the teachings herein. For example, retractable bodies (222) may each be a singular body such the base of each retractable body (222) is fixed relative to the top portion having frame contact surface (224). Therefore, bias spring (226) may be coupled to a top portion of retractable body (222) on one end while being coupled to pad support platform (202) on the other end.

Similar to arm adapter assembly (100) described above, due to the retractable nature of retractable bodies (222), arm adapter assembly (200) may suitably accept a first subset of vehicle frames (F1) while retractable bodies (222) are in the extended configuration; while arm adapter assembly (200) may suitably accept a second subset of vehicle frames (F2) while retractable bodies (222) are in the retracted configuration.

While in the extended configuration, an exterior perimeter of retractable bodies (222) (comprising a retaining surface (228)) of each frame retaining assembly (220) are configured to form a lateral boundary. Similar to the lateral boundary formed by frame retaining surface (148) described above, this lateral boundary may prevent a first subset of vehicle frames (F1), such as truck frames with a slick undercoating, from slipping out of engagement with vehicle engagement pad (204) during example use. Therefore, vehicle engagement pad (204) may suitably engage the first subset of vehicle frames (F1) while frame retaining assembly (220) are in the extended configuration such that arm adapter assemblies (200) may lift the first subset of vehicle frames (F1) in conjunction with two-post lift (10) in a substantially similar fashion as arm adapter assemblies (100) described above.

Additionally, arm adapter assembly (200), while in the retracted configuration, may be used to lift a second type of vehicle frame (F2). FIGS. 13A-13C show an exemplary use of arm adapter assembly (200) in conjunction with two-post lift (10) in order to lift the second type of vehicle frame (F2), such as a pinch weld frame or a unibody frame. First, an operator may place a vehicle between lift posts (12, 14). Next, the operator may move adjustable lifting arms (22) such that arm adapter assemblies (200) are adjacent to suitable portions of vehicle frame (F2), as shown in FIG. 13A.

With arm adapter assemblies (200) adjacent to suitable portions of vehicle frame (F2), the operator may actuate carriages (20) upward via control assembly (50). First, as shown in FIG. 13B, vehicle frame (F2) may make initial contact with frame contact surfaces (224). As shown in FIG. 13B, retractable bodies (222) are still in the extended configuration.

However, as shown between FIGS. 13B-13C, further upward actuation of carriages (20) forces further contact between vehicle frame (F2) and frame contact surfaces (224) of retractable bodies (222). Since retractable bodies (222) are configured to vertically actuate relative to vehicle engagement pad (204), contact between vehicle frame (F2) and contact surfaces (224) overcomes the biasing force provided by spring (226) and drives retractable bodies (222) into the retracted configuration. With retractable bodies (222) in the retracted configuration, pad (204) may be in suitable engagement with vehicle frame (F2) such that pad (204) supports vehicle frame (F2) for lifting purposes. Additionally, frame contact surface (224) is housed within through hole (212) such that retractable bodies (222) do not substantially support vehicle frame (F2) for lifting purposes.

Vehicle frame (F2), unlike vehicle frame (F1) described above, does not have a suitable geometry to fit between the lateral gap defined by retractable bodies (222) Therefore, if retractable bodies (222) were not able to actuate into the retracted configuration, contact between retractable bodies (222) and vehicle frame (F2) would prevent pad (204) from suitably engaging vehicle frame (F2), which may in turn damage vehicle frame (F2). Therefore, due to the retractable nature of arm adapter assembly (200), arm adapter assembly (200) may be used with a first subset of vehicle frames (F1), such as a truck frame, as well as a second subset of vehicle frames (F2) such as a pinch weld frame or a unibody frame; such that arm adapter assemblies (200) do not need to be exchanged between lifting both types of vehicle frames (F1, F2).

Once the operator wishes to lower vehicle frame (F2), the operator may lower carriages (20) in accordance with the description herein. Once arm adapter assembly (200) is no longer in suitable engagement with vehicle frame (F2), biasing springs (226) may drive retractable bodies (222) back into the extended configuration.

Frame retaining assemblies (220) may include a latching device for each retractable body (222) configured to selective latch retractable bodies (222) into the retracted configuration. For instance, latching device may allow a user to push retractable body (222) toward the retracted configuration until a tactile response is felt, thereby indicating to the user that the retractable body (222) is currently locked in the retracted configuration. When the user desire to unlatch retractable body (222), the user may further push retractable body (222) down until a second tactile response is felt, thereby releasing the latching device and allowing the bias spring (226) to bias the retractable body (222) back into the expanded configuration. Any suitable latching device may be used as would be apparent to one skilled in the art in view of the teachings herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the claims that may appear herein and is understood not to be limited to the details of structure and operation shown and described in the specification and drawings.

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A vehicle arm adapter, comprising: (i) a base member configured to selectively couple to a lifting arm of a vehicle lift; (ii) a platform assembly coupled to the base, wherein the platform assembly comprises vehicle engagement surface, wherein the platform assembly is configured, while the base member is coupled to the lifting arm, to engage and lift a vehicle in coordination with the vehicle lift; and (iii) an adjustable frame retaining assembly coupled with the platform assembly, wherein the adjustable frame retaining assembly comprises: (a) a first retractable assembly comprising a first retaining ear body comprising a first frame retaining surface, and (b) a second retractable assembly comprising a second retaining ear body comprising a second frame retaining surface, wherein the first retractable assembly and the second retractable assembly are configured to actuate between an extended configuration and a retracted configuration, wherein the first frame retaining surface and the second frame retaining surface are configured to cooperatively contain a first subset of vehicle frames in the extended configuration, wherein the first frame retaining surface and the second frame retaining surface are prevented from contacting a second subset of vehicle frames in the retracted configuration.

Example 2

The vehicle arm adapter of Example 1, wherein the base member comprises a coupling configured to selectively couple with the lifting arm.

Example 3

The vehicle arm adapter of Example 2, wherein the coupling comprises a male threading.

Example 4

The vehicle arm adapter of any one or more of Examples 1 through 2, wherein the platform assembly comprises a platform and a vehicle engagement pad.

Example 5

The vehicle arm adapter of Example 4, wherein the platform comprises a pair of lips that at least partially constrain the vehicle engagement pad.

Example 6

The vehicle arm adapter of any one or more of Examples 4 through 5, wherein the vehicle engagement pad is configured to be selectively removed from the platform.

Example 7

The vehicle arm adapter of any one or more of Examples 1 through 6, wherein the adjustable frame retaining assembly comprises a latch assembly configured to selectively retain the adjustable frame retaining assembly in the retracted configuration.

Example 8

The vehicle arm adapter of any one or more of Examples 1 through 7, wherein the first retractable assembly and the second retractable assembly each comprise a contact surface configured to engage the second subset of vehicle frames such at the second subset of vehicle frames drives the first retractable assembly and the second retractable assembly into the retracted configuration.

Example 9

The vehicle arm adapter of any one or more of Examples 1 through 8, wherein the first frame retaining surface and the second frame retaining surface are located beneath the vehicle engagement surface in the retracted position.

Example 10

The vehicle arm adapter of any one or more of Examples 1 through 10, wherein the first retractable assembly comprises a first bias spring configured to bias the first retractable assembly into the extended configuration.

Example 11

The vehicle arm adapter of Example 10, wherein the first bias spring comprises a torsion spring.

Example 12

The vehicle arm adapter of any one or more of Examples 1 through 11, wherein the first retraceable assembly is pivotally coupled with the platform assembly.

Example 13

The vehicle arm adapter of Example 12, wherein the first retractable assembly comprises a pivot pin extending through the first retaining ear body.

Example 14

The vehicle frame adapter of Example 13, wherein the first retaining ear body defines a pin hole dimensioned to house the pivot pin.

Example 15

The vehicle frame adapter of any one or more of Examples 1 through 14, wherein the platform assembly defines a pair of recesses housing the respective first retractable assembly and the second retractable assembly.

Example 16

A vehicle arm adapter, comprising: (i) a base member configured to selectively couple to a lifting arm of a vehicle lift; (ii) a platform assembly coupled to the base member, wherein the platform assembly comprises a vehicle engagement surface defining a pair of recesses, wherein the platform assembly is configured, while the base member is coupled to the lifting arm, to engage and lift a vehicle in coordination with the vehicle lift; and (iii) an adjustable frame retaining assembly coupled with the platform assembly, wherein the adjustable frame retaining assembly comprises: (a) a first retractable assembly comprising a first retaining body at least partially housed within a first recess of the pair of recesses, and (b) a second retractable assembly comprising a second retaining body at least partially housed within a second recess of the pair of recesses, wherein the first retractable assembly and the second retractable assembly are configured to actuate between an extended configuration and a retracted configuration, wherein the first retractable assembly and the second retractable assembly, while in the extended configuration, are configured to cooperatively contain a first subset of vehicle frames, wherein the first retractable assembly and the second retractable assembly, while in the retracted configuration, is prevented from contacting a second subset of vehicle frames thereby allowing the platform assembly to suitably engage the second subset of vehicle frames.

Example 17

The vehicle adapter arm of Example 16, wherein the first subset of frames comprises a truck frame, wherein the second subset of frames comprises a unibody frame and a pinch weld frame.

Example 18

The vehicle adapter arm of any one or more of Examples 16 through 17, wherein the adjustable frame retaining assembly comprises a latch assembly configured to latch the first retractable assembly and the second retractable assembly in the retracted configuration.

Example 19

A vehicle arm adapter, comprising: (i) a base member configured to selectively couple to a lifting arm of a vehicle lift; (ii) a platform assembly coupled to the base member, wherein the platform assembly comprises vehicle engagement surface defining a pair of recesses, wherein the platform assembly is configured, while the base member is coupled to the lifting arm, to engage and lift a vehicle in coordination with the vehicle lift; and (iii) an adjustable frame retaining assembly coupled with the platform assembly, wherein the adjustable frame retaining assembly is configured to actuate between an extended configuration and a retracted configuration, wherein the adjustable frame retaining assembly, while in the extended configuration, is configured to contain a first subset of vehicle frames, wherein the adjustable frame retaining assembly, while in the retracted configuration, is housed within the pair of recesses and prevented from contacting a second subset of vehicle frames.

Example 20

The vehicle arm adapter of Example 19, wherein the adjustable frame retaining assembly is biased toward the extended configuration.

What is claimed is:

1. A vehicle arm adapter, comprising:
(i) a base member configured to selectively couple to a lifting arm of a vehicle lift;
(ii) a platform assembly coupled to the base member, wherein the platform assembly comprises a vehicle engagement surface, wherein the platform assembly is configured, while the base member is coupled to the lifting arm, to engage and lift a vehicle in coordination with the vehicle lift; and
(iii) an adjustable frame retaining assembly coupled with the platform assembly, wherein the adjustable frame retaining assembly comprises:
(a) a first retractable assembly comprising a first retaining ear body comprising a first frame retaining surface, and
(b) a second retractable assembly comprising a second retaining ear body comprising a second frame retaining surface,
wherein the first retractable assembly and the second retractable assembly are configured to actuate between an extended configuration and a retracted configuration,
wherein the first frame retaining surface and the second frame retaining surface are configured to cooperatively contain a first subset of vehicle frames in the extended configuration,
wherein the first frame retaining surface and the second frame retaining surface are prevented from contacting a second subset of vehicle frames in the retracted configuration,
wherein the vehicle engagement surface is configured to engage the first subset of vehicle frames when the first retractable assembly and the second retractable assembly are in the extended configuration, and
wherein the vehicle engagement surface is configured to engage the second subset of vehicle frames when the first retractable assembly and the second retractable assembly are in the retracted configuration.

2. The vehicle arm adapter of claim 1, wherein the base member comprises a coupling configured to selectively couple with the lifting arm.

3. The vehicle arm adapter of claim 2, wherein the coupling comprises a male threading.

4. The vehicle arm adapter of claim 1, wherein the platform assembly comprises a platform and a vehicle engagement pad.

5. The vehicle arm adapter of claim 4, wherein the platform comprises a pair of lips that at least partially constrain the vehicle engagement pad.

6. The vehicle arm adapter of claim 4, wherein the vehicle engagement pad is configured to be selectively removed from the platform.

7. The vehicle arm adapter of claim 1, wherein the adjustable frame retaining assembly comprises a latch assembly configured to selectively retain the adjustable frame retaining assembly in the retracted configuration.

8. The vehicle arm adapter of claim 1, wherein the first retractable assembly and the second retractable assembly each comprise a contact surface configured to engage the second subset of vehicle frames such that the second subset of vehicle frames drives the first retractable assembly and the second retractable assembly into the retracted configuration.

9. The vehicle arm adapter of claim 1, wherein the first frame retaining surface and the second frame retaining surface are located beneath the vehicle engagement surface in the retracted position.

10. The vehicle arm adapter of claim 1, wherein the first retractable assembly comprises a first bias spring configured to bias the first retractable assembly into the extended configuration.

11. The vehicle arm adapter of claim 10, wherein the first bias spring comprises a torsion spring.

12. The vehicle arm adapter of claim 1, wherein the first retractable assembly is pivotally coupled with the platform assembly.

13. The vehicle arm adapter of claim 12, wherein the first retractable assembly comprises a pivot pin extending through the first retaining ear body.

14. The vehicle frame adapter of claim 13, wherein the first retaining ear body defines a pin hole dimensioned to house the pivot pin.

15. The vehicle frame adapter of claim 1, wherein the platform assembly defines a pair of recesses housing the respective first retractable assembly and the second retractable assembly.

16. A vehicle arm adapter, comprising:
(i) a base member configured to selectively couple to a lifting arm of a vehicle lift;
(ii) a platform assembly coupled to the base member, wherein the platform assembly comprises a vehicle engagement surface defining a pair of recesses, wherein the platform assembly is configured, while the base member is coupled to the lifting arm, to engage and lift a vehicle in coordination with the vehicle lift; and
(iii) an adjustable frame retaining assembly coupled with the platform assembly, wherein the adjustable frame retaining assembly comprises:
(a) a first retractable assembly comprising a first retaining body at least partially housed within a first recess of the pair of recesses, and
(b) a second retractable assembly comprising a second retaining body at least partially housed within a second recess of the pair of recesses,
wherein the first retractable assembly and the second retractable assembly are configured to actuate between an extended configuration and a retracted configuration,
wherein the first retractable assembly and the second retractable assembly, while in the extended configuration and in conjunction with the vehicle engagement surface, are configured to cooperatively contain a first subset of vehicle frames by defining a boundary that the first subset of vehicle frames may rest between while the vehicle engagement surface of the platform assembly suitably engages the first subset of vehicle frames,
wherein the first retractable assembly and the second retractable assembly, while in the retracted configuration, are prevented from contacting a second subset of vehicle frames, thereby allowing the vehicle engagement surface of the platform assembly to suitably engage the second subset of vehicle frames.

17. The vehicle adapter arm of claim 16, wherein the first subset of frames comprises a truck frame, wherein the second subset of frames comprises a unibody frame and a pinch weld frame.

18. The vehicle adapter arm of claim 16, wherein the adjustable frame retaining assembly comprises a latch assembly configured to latch the first retractable assembly and the second retractable assembly in the retracted configuration.

19. A vehicle arm adapter, comprising:

(i) a base member configured to selectively couple to a lifting arm of a vehicle lift;

(ii) a platform assembly coupled to the base member, wherein the platform assembly comprises a vehicle engagement surface defining a pair of recesses, wherein the vehicle engagement surface is configured, while the base member is coupled to the lifting arm, to engage and lift a vehicle in coordination with the vehicle lift; and (iii) an adjustable frame retaining assembly coupled with the platform assembly, wherein the adjustable frame retaining assembly is configured to actuate between an extended configuration and a retracted configuration, wherein the adjustable frame retaining assembly, while in the extended configuration, is configured to contain a first subset of vehicle frames while the vehicle engagement surface engages a first vehicle frame of the first subset of vehicle frames, wherein the adjustable frame retaining assembly, while in the retracted configuration, is housed within the pair of recesses and prevented from contacting a second subset of vehicle frames while the vehicle engagement surface engages a second vehicle frame the second subset of vehicle frames, wherein a first recess of the pair of recesses is positioned on an opposing side of the vehicle engagement surface to a second recess of the pair of recesses.

20. The vehicle arm adapter of claim 19, wherein the adjustable frame retaining assembly is biased toward the extended configuration.

* * * * *